United States Patent
Imai et al.

(10) Patent No.: US 9,430,252 B2
(45) Date of Patent: Aug. 30, 2016

(54) INFORMATION PROCESSING APPARATUS, STORAGE MEDIUM, INFORMATION PROCESSING SYSTEM AND INFORMATION PROCESSING METHOD

(75) Inventors: Daiji Imai, Kyoto (JP); Hideki Konno, Kyoto (JP); Kazunobu Shimizu, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 1298 days.

(21) Appl. No.: 13/017,613

(22) Filed: Jan. 31, 2011

(65) Prior Publication Data

US 2012/0072866 A1    Mar. 22, 2012

(30) Foreign Application Priority Data

Sep. 16, 2010    (JP) ................. 2010-208136

(51) Int. Cl.
*G06F 9/44*    (2006.01)

(52) U.S. Cl.
CPC ..... *G06F 9/4443* (2013.01); *A63F 2300/1043* (2013.01); *A63F 2300/204* (2013.01); *A63F 2300/301* (2013.01)

(58) Field of Classification Search
CPC .............. G06F 3/048; H04M 1/72544; A63F 2300/308; A63F 13/53
USPC ....... 715/738, 804, 803, 806, 205, 762, 835; 345/345, 340, 332, 172
See application file for complete search history.

(56) References Cited

U.S. PATENT DOCUMENTS

| | | | | |
|---|---|---|---|---|
| 5,392,166 A | * | 2/1995 | Furuya et al. | 386/244 |
| 5,872,562 A | * | 2/1999 | McConnell et al. | 345/169 |
| 6,139,197 A | * | 10/2000 | Banks | 709/217 |
| 6,172,672 B1 | * | 1/2001 | Ramasubramanian et al. | 715/720 |
| 6,659,873 B1 | * | 12/2003 | Kitano et al. | 463/42 |
| 6,957,395 B1 | * | 10/2005 | Jobs et al. | 715/765 |
| 7,233,807 B2 | * | 6/2007 | Lim | 455/556.1 |
| 7,595,810 B2 | * | 9/2009 | Louch | 345/629 |
| 8,040,360 B2 | * | 10/2011 | Louch | 345/629 |
| 8,360,841 B2 | * | 1/2013 | Walker et al. | 463/16 |
| 8,572,515 B2 | * | 10/2013 | Ainslie et al. | 715/863 |
| 9,032,296 B1 | * | 5/2015 | Jeffs | H04N 21/2187 715/719 |
| 2001/0035882 A1 | * | 11/2001 | Stoakley et al. | 345/779 |
| 2004/0019611 A1 | * | 1/2004 | Pearse | G06F 17/30887 |
| 2004/0085328 A1 | * | 5/2004 | Maruyama et al. | 345/619 |
| 2005/0026657 A1 | * | 2/2005 | Hasegawa | H04M 1/72583 455/566 |
| 2005/0052338 A1 | * | 3/2005 | Suzuki | H04N 7/15 345/1.1 |
| 2005/0083642 A1 | * | 4/2005 | Senpuku et al. | 361/681 |
| 2005/0213833 A1 | * | 9/2005 | Okada et al. | 382/240 |
| 2006/0112335 A1 | * | 5/2006 | Hofmeister et al. | 715/701 |
| 2006/0123353 A1 | * | 6/2006 | Matthews et al. | 715/779 |

(Continued)

FOREIGN PATENT DOCUMENTS

| | | |
|---|---|---|
| JP | 2002-320766 | 11/2002 |
| JP | 2007-222459 | 9/2007 |

*Primary Examiner* — Jeffrey A Gaffin
*Assistant Examiner* — Mandrita Brahmachari
(74) *Attorney, Agent, or Firm* — Nixon & Vanderhye PC

(57) ABSTRACT

A game apparatus as an information processing apparatus includes a CPU, and the CPU executes a program as to a memo application and another application different from the memo application. When the program of the memo application is executed during execution of the other application, a screen of an execution result of the program of the other application is captured, and the captured image is displayed on a stereoscopic LCD. On the other hand, a memo creating screen is displayed on a lower LCD.

29 Claims, 34 Drawing Sheets

(56) References Cited

U.S. PATENT DOCUMENTS

| | | |
|---|---|---|
| 2006/0156254 A1* | 7/2006 | Satake .................... 715/838 |
| 2006/0200842 A1* | 9/2006 | Chapman ............. H04N 7/163 725/34 |
| 2006/0242602 A1* | 10/2006 | Schechter et al. ........... 715/838 |
| 2006/0248404 A1* | 11/2006 | Lindsay et al. ................ 714/38 |
| 2007/0070473 A1* | 3/2007 | Lu et al. ..................... 358/537 |
| 2007/0142099 A1* | 6/2007 | Seo et al. .................. 455/575.3 |
| 2007/0201069 A1* | 8/2007 | Tanaka et al. ................ 358/1.13 |
| 2007/0244970 A1* | 10/2007 | Watanabe ............. G06Q 10/10 709/204 |
| 2007/0255767 A1* | 11/2007 | Kikuchi .................... 707/204 |
| 2007/0290999 A1* | 12/2007 | Cho et al. ................... 345/158 |
| 2008/0119235 A1* | 5/2008 | Nielsen ................ G06F 3/0483 455/566 |
| 2008/0220869 A1* | 9/2008 | Midgley et al. ............... 463/40 |
| 2008/0220872 A1* | 9/2008 | Midgley et al. ............... 463/42 |
| 2008/0228777 A1* | 9/2008 | Sawant .................. H04L 67/06 |
| 2008/0305856 A1* | 12/2008 | Walker et al. ................. 463/25 |
| 2009/0189982 A1* | 7/2009 | Tawiah ....................... 348/157 |
| 2009/0253507 A1* | 10/2009 | Ishii ........................ A63F 13/12 463/32 |
| 2010/0015579 A1* | 1/2010 | Schlabach ..................... 434/11 |
| 2010/0083016 A1* | 4/2010 | Inada ........................ 713/310 |
| 2010/0260468 A1* | 10/2010 | Khatib et al. .................. 386/52 |
| 2010/0298043 A1* | 11/2010 | Bytnar et al. .................. 463/24 |
| 2010/0299597 A1* | 11/2010 | Shin et al. .................... 715/702 |
| 2011/0181504 A1* | 7/2011 | Ishikawa et al. ............. 345/156 |
| 2012/0117599 A1* | 5/2012 | Jin ................... H04N 21/41407 725/41 |
| 2013/0113698 A1* | 5/2013 | Kuroume et al. ............ 345/156 |
| 2013/0120439 A1* | 5/2013 | Harris et al. .................. 345/619 |
| 2013/0339855 A1* | 12/2013 | Shivadas et al. ............. 715/720 |

\* cited by examiner

FIG. 6
(A)
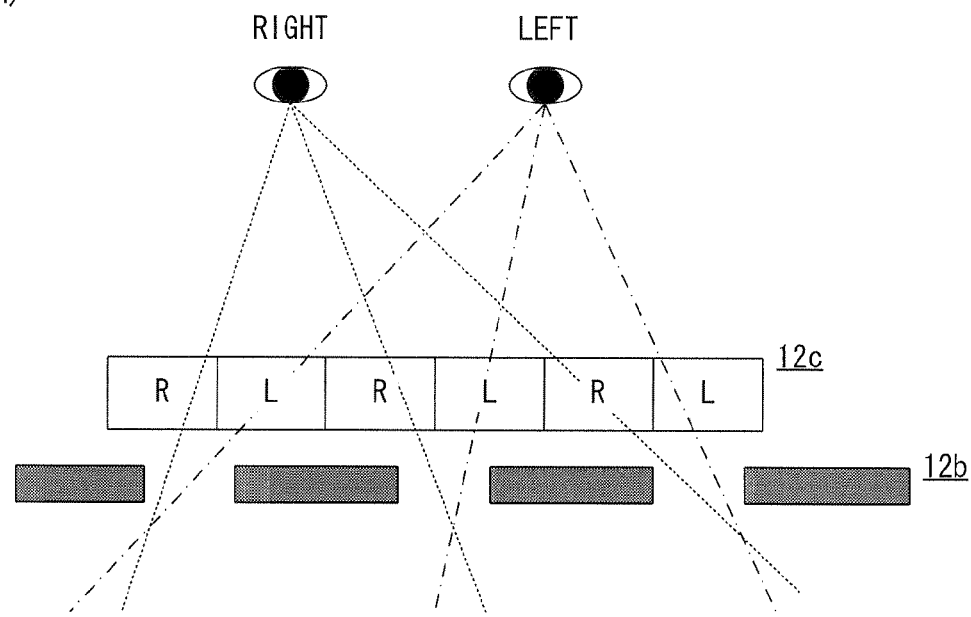
(B)
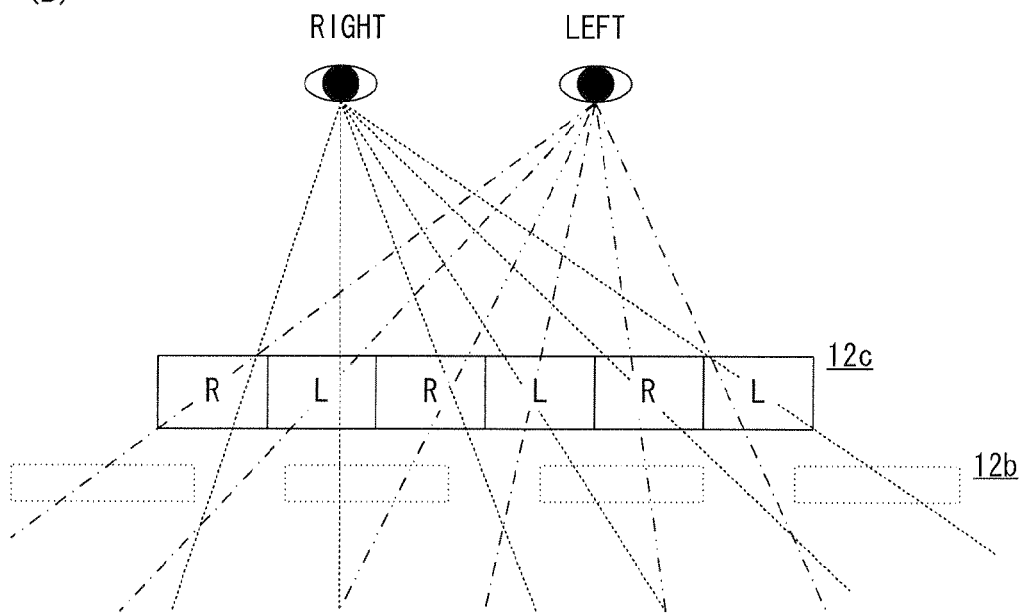

FIG. 9
(A)
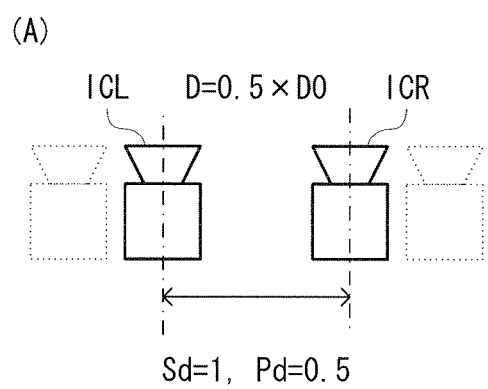
ICL   D=0.5×D0   ICR
Sd=1,  Pd=0.5
(B)
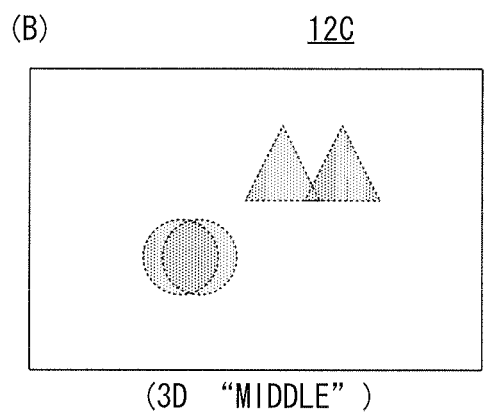
12C
(3D "MIDDLE")

FIG. 10
(A)
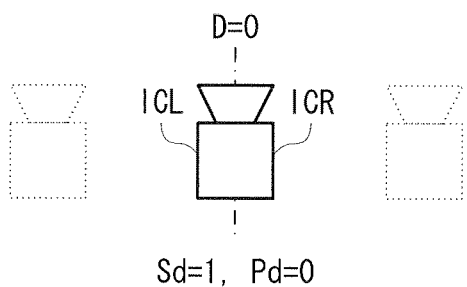
Sd=1, Pd=0
(B)
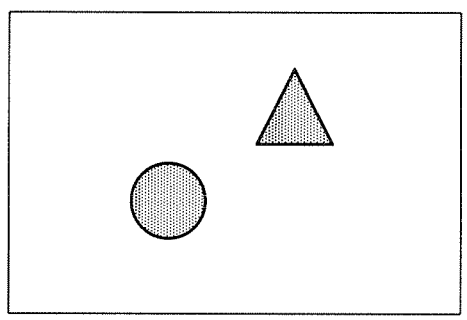
(3D "MINIMUM" = 2D)

FIG. 12
(A) FIRST GAME SCREEN 200
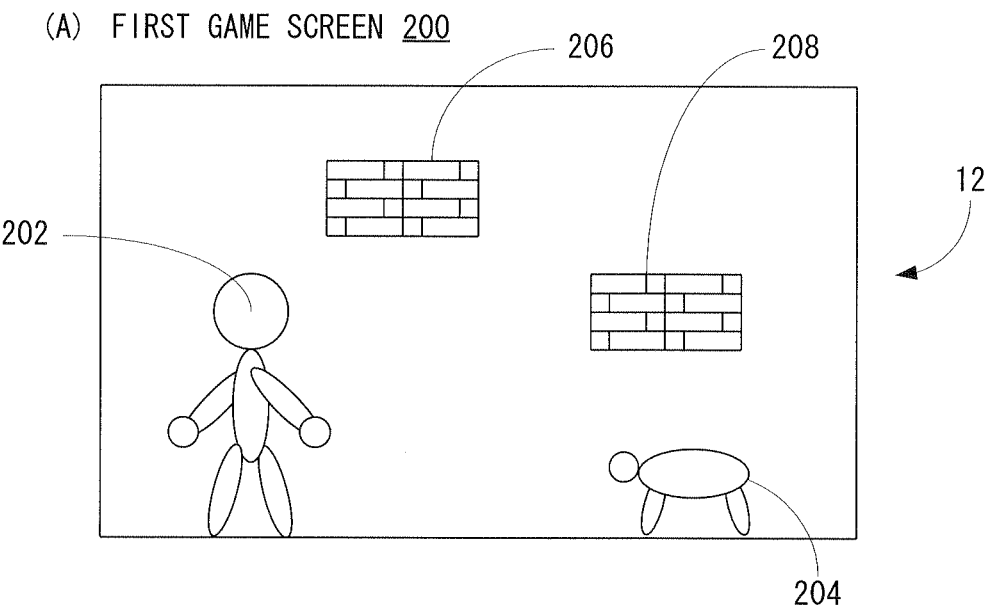
(B) SECOND GAME SCREEN 250
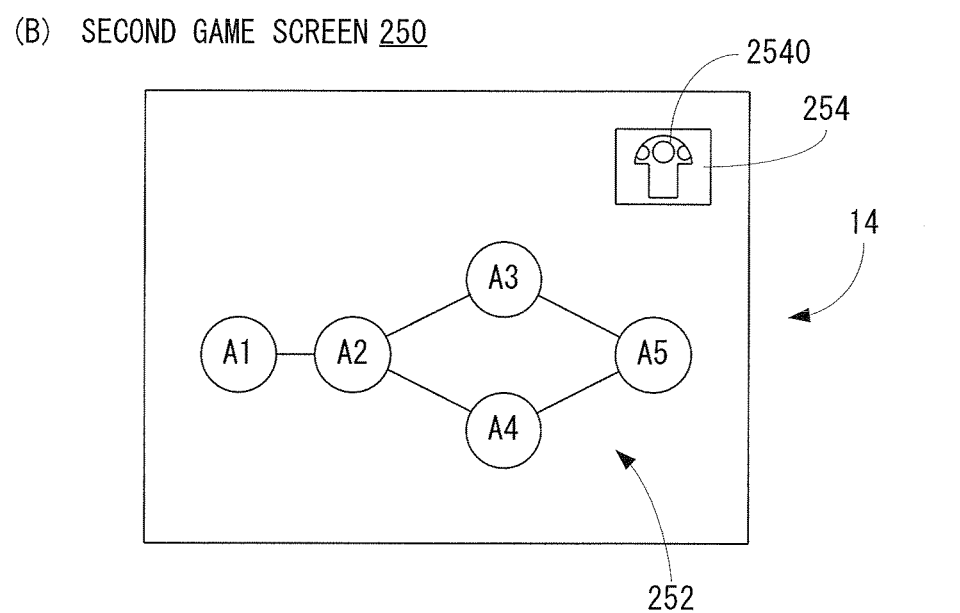

FIG. 13
(A) CAPTURED SCREEN 300
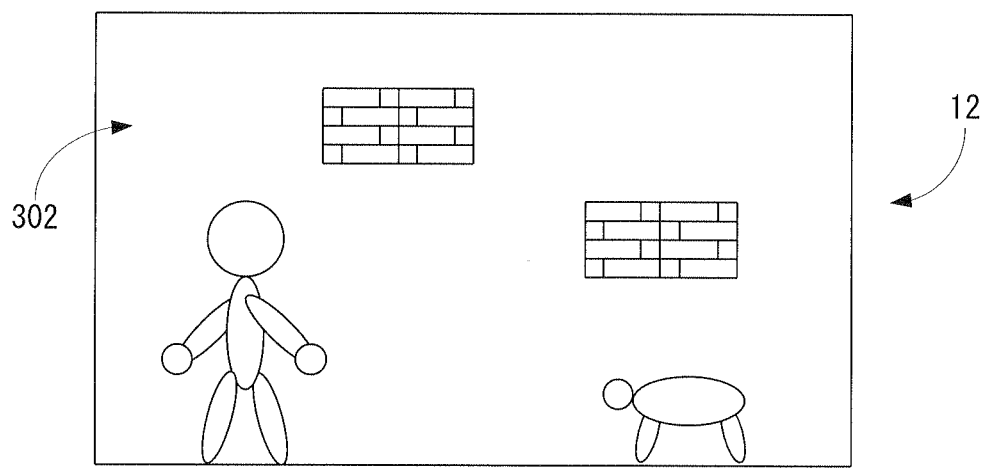
(B) LIST OF MEMO SCREEN 350
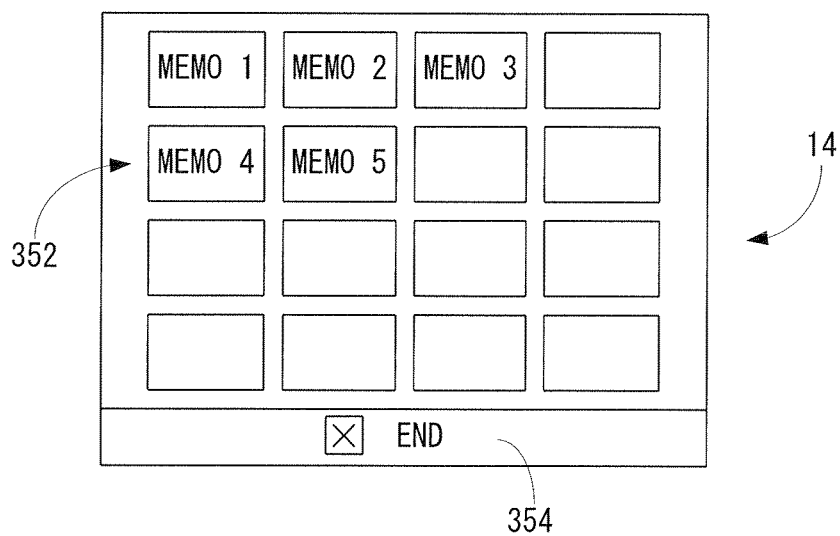

FIG. 14
(A) CAPTURED SCREEN 300
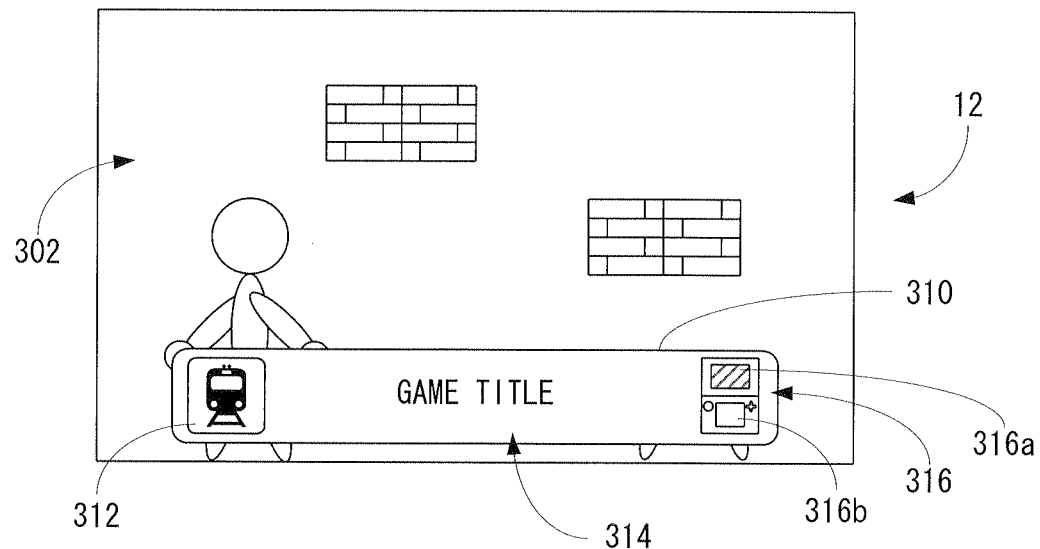
(B) MEMO CREATING SCREEN 400
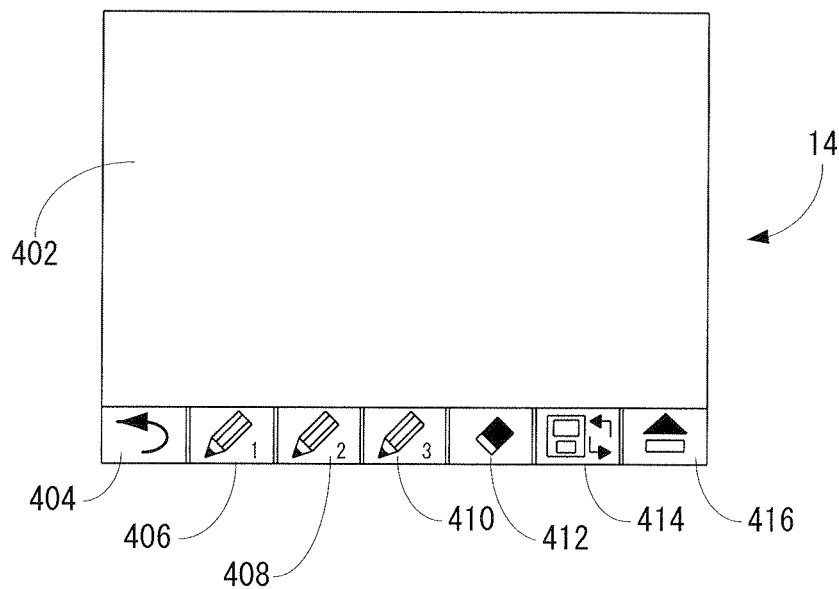

FIG. 15
(A) MEMO CREATING SCREEN 400
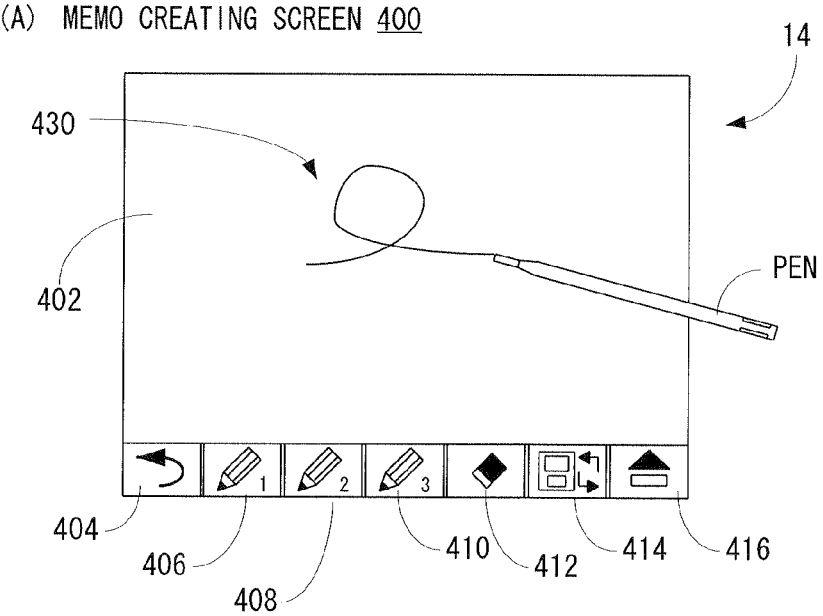
(B) CAPTURED SCREEN 300
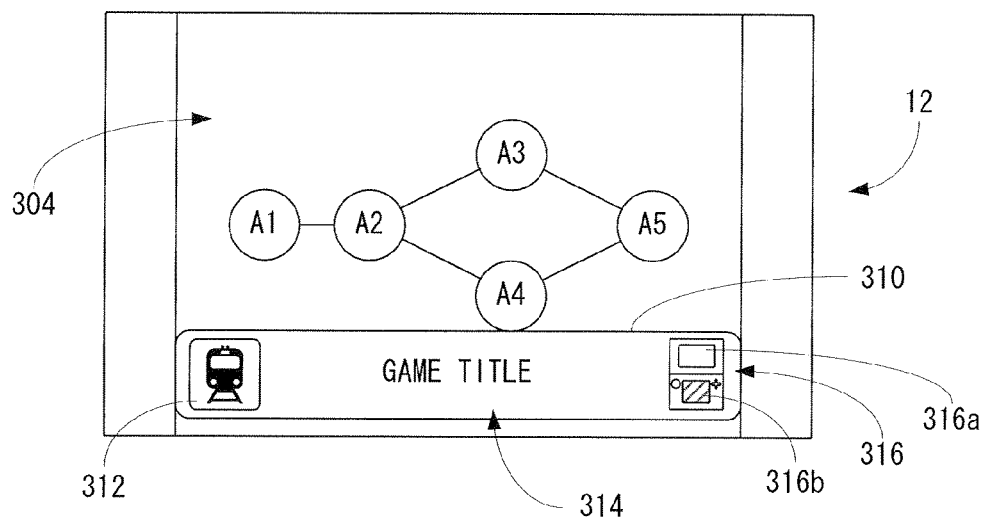

FIG. 16
(A) CAPTURED SCREEN 300
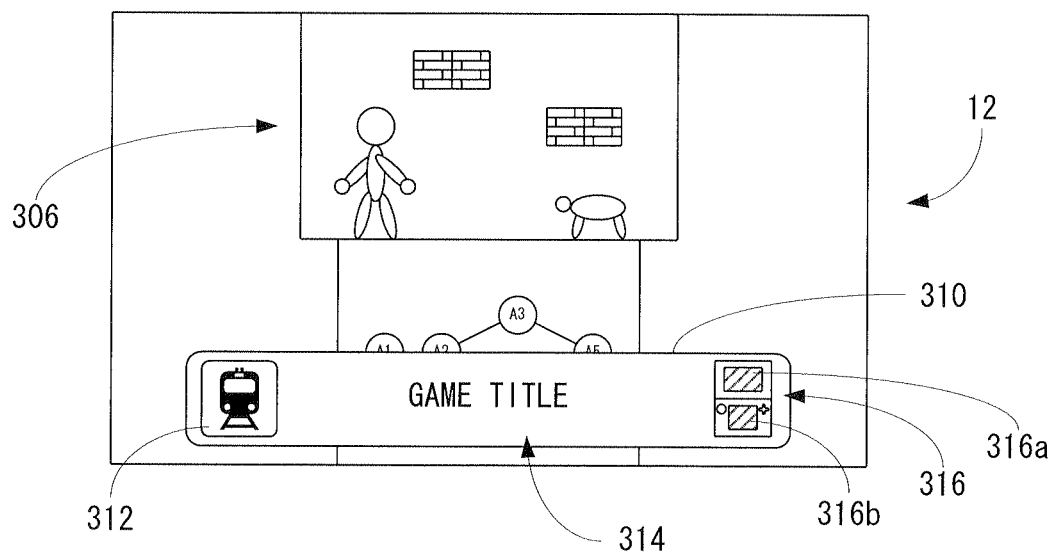
(B) MEMO CREATING SCREEN 400
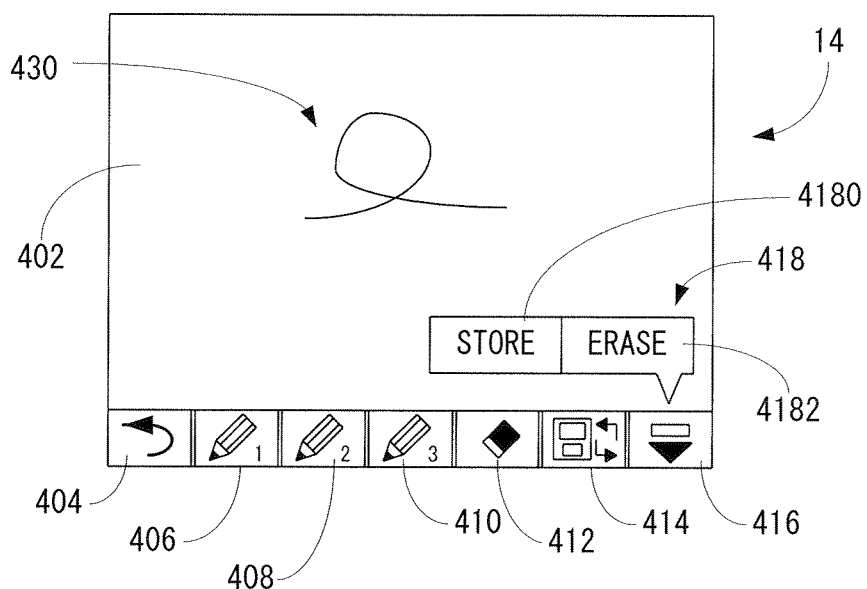

FIG. 30
(A) MEMO CREATING SCREEN 400
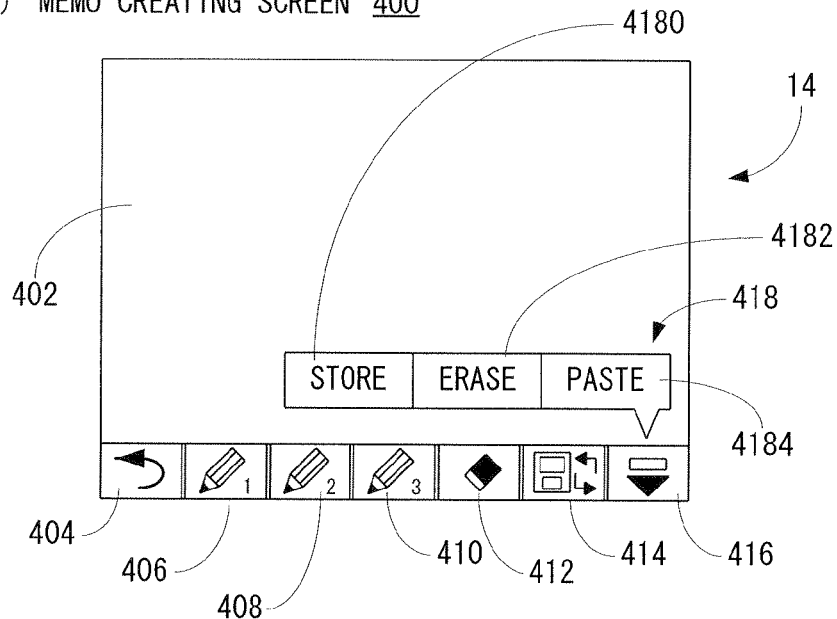
(B) MEMO CREATING SCREEN 400
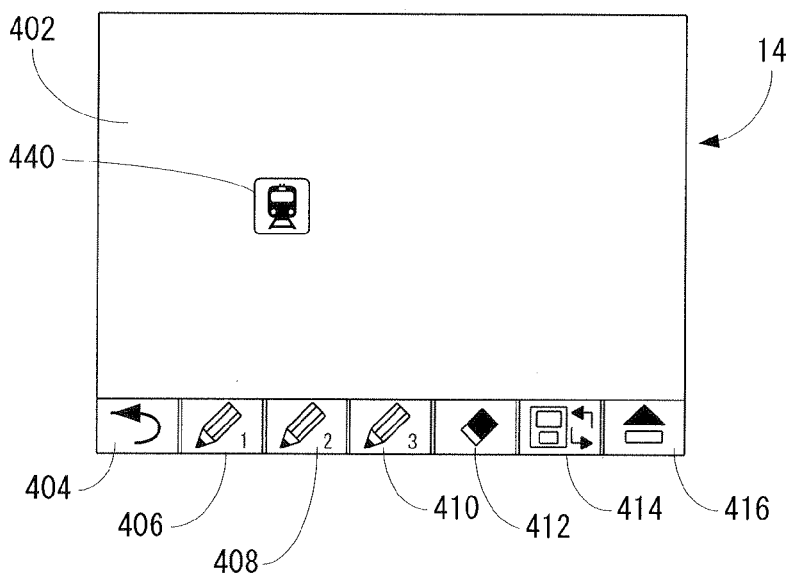

FIG. 31
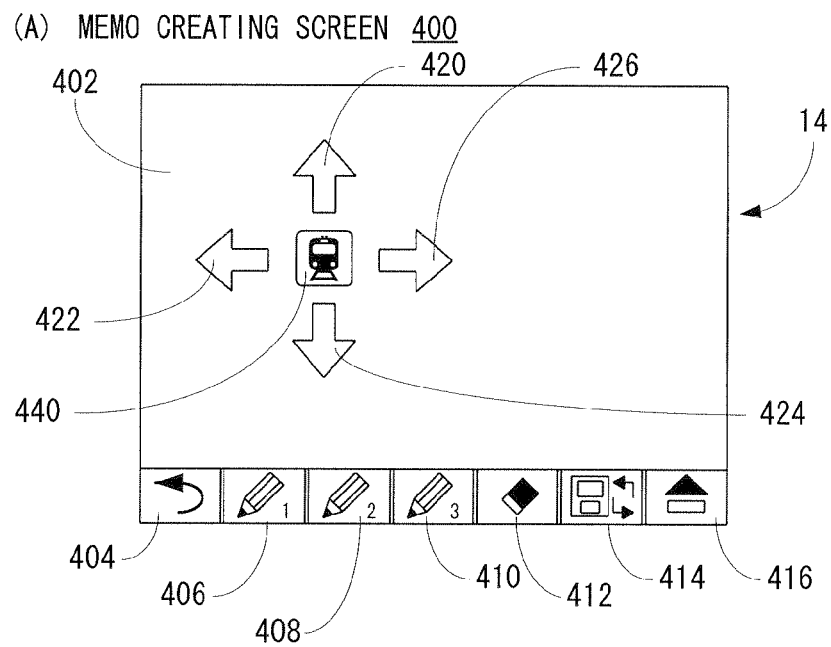
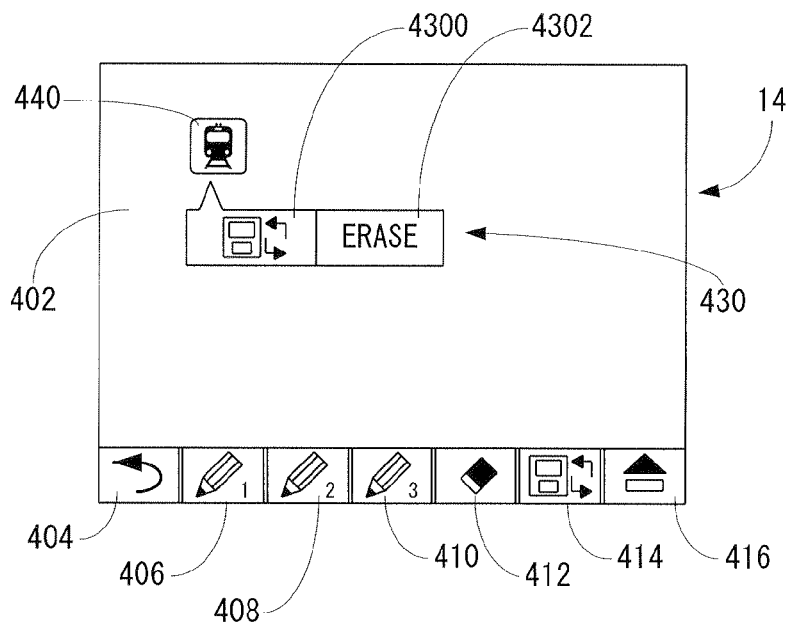

INFORMATION PROCESSING APPARATUS, STORAGE MEDIUM, INFORMATION PROCESSING SYSTEM AND INFORMATION PROCESSING METHOD

CROSS REFERENCE OF RELATED APPLICATION

The disclosure of Japanese Patent Application No. 2010-208136 is incorporated herein by reference.

BACKGROUND OF THE INVENTION

1. Field of the Invention

The present invention relates to an information processing apparatus, a storage medium, an information processing system and an information processing method. More specifically, the present invention relates to an information processing apparatus, a storage medium, an information processing system and an information processing method which create a memo during execution of information processing.

2. Description of the Related Art

One example of an information processing apparatus of such a kind is disclosed in Japanese Patent Application Laid-Open No. 2002-320766 [A63F 13/00] (Document 1) laid-open on Nov. 5, 2002. In a video game processing apparatus of this Document 1, a select key is pushed during execution of a game to thereby make a window for accepting an input to a memo appear. After completion of inputting the memo, the memo continues to be displayed at a predetermined position in an upper periphery of the screen, and a player plays a game, viewing the memo. When the select key is pushed again, the memo display is erased.

However, in the video game processing apparatus disclosed in the Document 1, when a memo is input, a game screen and a virtual space are partially hidden under a region for displaying the content of the input memo and a region for displaying a software keyboard, and an object about which a memo is to be made and an important matter, such as the arrangement, the encryption, etc. cannot be viewed or are sometimes hard to view.

SUMMARY OF THE INVENTION

Therefore, it is a primary object of the present invention to provide a novel information processing apparatus, a novel storage medium, a novel information processing system and a novel information processing method.

Furthermore, another object of the present invention is to provide an information processing apparatus, a storage medium, an information processing system and an information processing method capable of creating a memo with an important matter about which a memo is to be made viewed.

A first invention is an information processing apparatus having an inputter, a first display region, a second display region, and a storage storing an application program. The information processing program comprises a mode selector, a first executor, an application image displayer, and a second executor. The mode selector selects between a first mode executing a first application program as to another application except for a memo application and a second mode executing a second application program as to the memo application. The first executor executes the first application program and displays a result of the execution in at least one of the first display region and the second display region when the first mode is selected by the selector. The application image displayer displays in the first display region an application image which has been displayed in at least any one of the first display region and the second display region when the second mode is selected during execution of the first application program by the first executor. The second executor executes the second application program and displays memo information based on an input to the inputter in the second display region when the second mode is selected.

According to the first invention, at a time of making a memo, the application image which has been displayed in at least one of the first display region and the second display region is displayed in the first display region different from the second display region to input a memo, so that a player can make a memo, viewing an important matter about which a memo is to be made and matters in relation to the memo.

A second invention is according to the first invention, wherein the application image displayer displays in the first display region the image which has been displayed in at least one of the first display region and the second display by the first executor when or immediately before the second mode is selected.

In the second invention as well, similar to the first invention, the player can make a memo, viewing an important matter about which a memo is to be made and matters in relation to the memo.

A third invention is according to the first invention, wherein the first executor executes the first application program as to the other selected application out of the plurality of other applications.

According to the third invention, another application is selected from the plurality of other applications, and therefore, there is no restriction on other applications, and a memo as to the selected other application can be created. That is, it is possible to make memos as to the plurality of applications.

A fourth invention is according to the first invention, wherein the mode selector switches between the first mode and the second mode by a predetermined input to the inputter.

According to the fourth invention, it is possible to easily switch between the first application program and the second application program.

A fifth invention is according to the fourth invention, and an information processing apparatus further comprises a memory. The first executor develops the first application program in the memory and executes the same. The second executor develops the second application program in the memory and executes the same. For example, the first application program and the second application program are executed in parallel by multitasking. The mode selector determines whether or not both of the first application program and the second application program are executed when there is a predetermined input to the inputter, and switches to the mode that is not currently selected out of the first mode and the second mode when it is determined that that both of the modes are executed. When a mode is switched, the task that is not being executed is paused.

According to the fifth invention, by merely switching the mode, it becomes possible to switch between the first application program and the second application program. Furthermore, both of the tasks of the first application program and the second application program are activated, and therefore, a switch can be performed at a high speed.

A sixth invention is according to the first invention, wherein the first executor displays a result of the execution of the first application program in at least the second display region, and the application image displayer displays in the first display region the application image which has been displayed on the second display region by the first executor.

According to the sixth invention as well, similar to the first invention, the player can make a memo, viewing an important matter about which a memo is to be made and matters in relation to the memo.

A seventh invention is according to the first invention, wherein the first executor displays a result of the execution of the first application program in the first display region and the second display region, and the application image displayer displays the application images which have been displayed in the first display region and the second display region by the first executor in the first display region.

According to the seventh invention, at a time of making a memo, the application images which have been displayed in the first display region and the second display region are displayed in the first display region, and therefore, the player can easily grasp the whole of an important matter about which a memo is to be made and matters in relation to the memo.

An eighth invention is according to the seventh invention, wherein the application image displayer displays the application images which have been displayed in the first display region and the second display region by the first executor in a reduced-size in the first display region.

According to the eighth invention, the application images that have been displayed in the first display region and the second display region are displayed in a reduced-size in the first display region, and therefore, it is possible to grasp the whole of an important matter about which a memo is to be made and matters in relation to the memo at a time.

A ninth invention is according to the first invention, wherein the first executor displays the result of the execution of the first application program in the first display region and the second display region. The application image displayer switchably displays in the first display region a first application image which has been displayed in the first display region or a second application image which has been displayed in the second display region by the first executor.

According to the ninth invention, the first application image and the second application image are switched, and therefore, the player can create a memo, individually checking them.

A tenth invention is according to the ninth invention, wherein the application image displayer further switchably displays in the first display region a third application image being made up of the application images which have been displayed in the first display region and the second display region.

According to the tenth invention, switching to the third application image is performed, and therefore, the player can create a memo, individually checking the first application image and the second application image or checking them as a whole by the third application image.

An eleventh invention is according to the first invention, wherein the first executor displays the result of the execution of the first application program in the first display region and the second display region. The application image displayer switchably displays between at least one of the first application image displayed in the first display region and the second application image displayed in the second display region by the first executor and the third application image being made up of the application images that have been displayed in the first display region and the second display region.

According to the eleventh invention, switching between at least one of the images displayed in the first display region and in the second display region and the images displayed on both of the first display region and second display region can be made, and therefore, the player can create a memo, checking the individual images and the image as a whole.

A twelfth invention is according to the tenth invention, wherein the third application image is an image obtained by arranging the first application image and the second application image and reduced to a size suitable for the first display region.

According to the twelfth invention, the first application image and the second application image are displayed to be arranged in the first display region, and therefore, the player can create a memo, viewing the images displayed in the first display region and second display region at a time.

A thirteenth invention is according to the first invention, wherein the storage stores title information that is brought into correspondence with each of the stored application programs. The application image displayer displays in the first display region or the second display region the title information corresponding to the first application program executed by the first executor in the first mode executed together with the application image which has been displayed in at least one of the first display region and the second display region by the first executor.

According to the thirteenth invention, the title information corresponding to the first application program is displayed together with the application image, and therefore, it is possible to check about which title a memo is created. Furthermore, the title information is displayed only for the predetermined time, and therefore, even if the title information is displayed at the foremost of the application images, for example, it is scarcely in the way.

A fourteenth invention is according to the thirteenth invention, wherein the application image displayer displays the title information only for a predetermined time.

According to the fourteenth invention, the title information is displayed only for the predetermined time, and therefore, even if the title information is displayed at the foremost of (above) the application images, for example, the title information is erased after a lapse of the predetermined time, and thus it is scarcely in the way.

A fifteenth invention is according to the first invention, and an information processing apparatus further comprises a memo storage and a memo information reproducer. The memo storage stores the application image displayed in the first display region by the application image displayer by bringing it into association with the memo information in the storage. Furthermore, the memo information reproducer displays the application image which is stored by being brought into association with the memo information in the storage together with the memo information in at least one of the first display region and the second display region.

According to the fifteenth invention, the application image is stored together with the memo information, and they are made reproducible, and therefore, in a case that the memo information is checked or edited, the application image stored together with the memo information can be referred. Accordingly, it is possible to easily remember the state of the application when the memo is created.

A sixteenth invention is according to the fifteenth invention, wherein the memo storage further stores the image indicating the first application program corresponding to the application image by bringing it into association with the memo information in the storage on the basis of an input to the inputter in the second mode. For example, a unique icon indicating the first application program and a reduced image obtained by reducing the application image are stored by being brought into association with the memo information. The memo information reproducer further displays the image indicating the first application program in at least one of the first display region and the second display region.

According to the sixteenth invention, the memo information and the image indicating the first application program are stored to be brought into association with each other, and reproducing is performed together with the memo information, and therefore, it is possible to easily grasp a corresponding relationship between the memo information and the application image.

A seventeenth invention is according to the first invention, and an information processing apparatus further comprises a first display device and a second display device. The first executor displays the result of the execution of the first application program in at least one of the first display device and the second display device. The application image displayer displays the application image which has been displayed on at least one of the first display device and the second display device by the first executor on the first display device. The second executor displays the memo information on the second display device.

According to the seventeenth invention, similar to the first invention, the player can make a memo, viewing an important matter about which a memo is to be made and matters in relation to the memo.

An eighteenth invention is according to the seventeenth invention, wherein the inputter includes a touch panel to be set on the second display device. The second executor creates the memo information on the basis of an input to the touch panel.

According to the eighteenth invention, the memo information is created on the basis of an input to the touch panel, and therefore, it is possible to make a free memo, like a handwritten memo.

A nineteenth invention is according to the first invention, and the information processing apparatus further comprising a memo storage and a list displayer. The memo storage stores the memo information in the storage. The list displayer executes the second application program, and displays a list of the memo information stored in the storage in the second display region when the second mode is selected. The second executor, when predetermined memo information is selected from the list of the memo information displayed in the second display region by the list displayer, displays the selected memo information in the second display region.

According to the nineteenth invention, the stored memo information is displayed by a list, and the memo information selected from the list of the memo information is displayed in the second display region, and therefore, it is possible to easily browse the past memo with reference to the current captured image.

A twentieth invention is a storage medium storing an information processing program of an information processing apparatus having an inputter, a first display region, a second display region, and a storage storing an application program, the information processing program causes a computer of the information processing apparatus to function as a mode selector, a first executor, an application image displayer, and a second executor. The mode selector selects between a first mode executing a first application program as to another application except for a memo application and a second mode executing a second application program as to the memo application. The first executor executes the first application program and displays a result of the execution in at least one of the first display region and the second display region when the first mode is selected by the selector. The application image displayer displays in the first display region an application image which has been displayed in at least one of the first display region and the second display region when the second mode is selected during execution of the first application program by the first executor. The second executor executes the second application program and displays memo information based on an input to the inputter in the second display region when the second mode is selected.

A twenty-first invention is an information processing system having an inputter, a first display region, a second display region, and a storage storing an application program, and comprising a mode selector, a first executor, an application image displayer, and a second executor. The mode selector selects between a first mode executing a first application program as to another application except for a memo application and a second mode executing a second application program as to the memo application. The first executor executes the first application program and displays a result of the execution in at least one of the first display region and the second display region when the first mode is selected by the selector. The application image displayer displays in the first display region an application image which has been displayed in at least one of the first display region and the second display region when the second mode is selected during execution of the first application program by the first executor. The second executor executes the second application program and displays memo information based on an input to the inputter in the second display region when the second mode is selected.

A twenty-second invention is an information processing method of an information processing apparatus having an inputter, a first display region, a second display region, and a storage storing an application program, including following steps of: (a) selecting between a first mode executing a first application program as to another application except for a memo application and a second mode executing a second application program as to the memo application; (b) executing the first application program and displaying a result of the execution in at least one of the first display region and the second display region when the first mode is selected by the step (a); (c) displaying in the first display region an application image which has been displayed in at least one of the first display region and the second display region by the step (b) when the second mode is selected during execution of the first application program by the step (b); and (d) executing the second application program and displaying memo information based on an input to the inputter in the second display region when the second mode is selected.

In the twentieth and twenty-second inventions as well, similar to the first invention, the player can make a memo, viewing an important matter about which a memo is to be made and matters in relation to the memo.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view for explaining a principle of a 3D/2D display in a parallax barrier system, FIG. 6(A) shows a state that a parallax barrier is turned on (3D display), and FIG. 6(B) shows a state that a parallax barrier is turned off (2D display);

FIG. 8(A) shows a left image of a VRAM, FIG. 8(B) shows a right image of the VRAM, and FIG. 8(C) shows a stereoscopic image (3D up to maximum of) on an upper LCD;

FIG. 9 is an illustrative view explaining a change of a stereoscopic image according to a distance-between cameras, FIG. 9(A) shows one example of the distance-between cameras (0.5×D0), and FIG. 9(B) shows a stereoscopic image corresponding to the relevant distance (3D is middle);

FIG. 10 is an illustrative view for explaining a 3D adjustment according to the distance-between cameras, FIG. 10(A) shows another example of the distance-between cameras (minimum value 0), and FIG. 10(B) shows a stereoscopic image corresponding to the relevant distance (3D is minimum=2D);

FIG. 12 is an illustrative view showing an example of a first game screen to be displayed on a stereoscopic LCD and a second game screen to be displayed on a lower LCD as shown in FIG. 1;

FIG. 13 is an illustrative view showing an example of a captured screen to be displayed on the stereoscopic LCD and an example of a list of memo screen to be displayed on the lower LCD as shown in FIG. 1;

FIG. 14 is an illustrative view showing another example of the captured screen to be displayed on the stereoscopic LCD and an example of a memo creating screen to be displayed on the lower LCD as shown in FIG. 1;

FIG. 15 is an illustrative view showing another example of the memo creating screen to be displayed on the lower LCD and a still another example of the captured screen to be displayed on the stereoscopic LCD and as shown in FIG. 1;

FIG. 16 is an illustrative view showing a further example of the captured screen to be displayed on the stereoscopic LCD and a still another example of the memo creating screen to be displayed on the lower LCD as shown in FIG. 1;

FIG. 30 is an illustrative view showing an example of a memo creating screen of another embodiment to be displayed on the lower LCD shown in FIG. 1;

FIG. 31 is an illustrative view showing another example of the memo creating screen of another embodiment to be displayed on the lower LCD shown in FIG. 1;

DETAILED DESCRIPTION OF THE PREFERRED EMBODIMENTS

Figure 1:
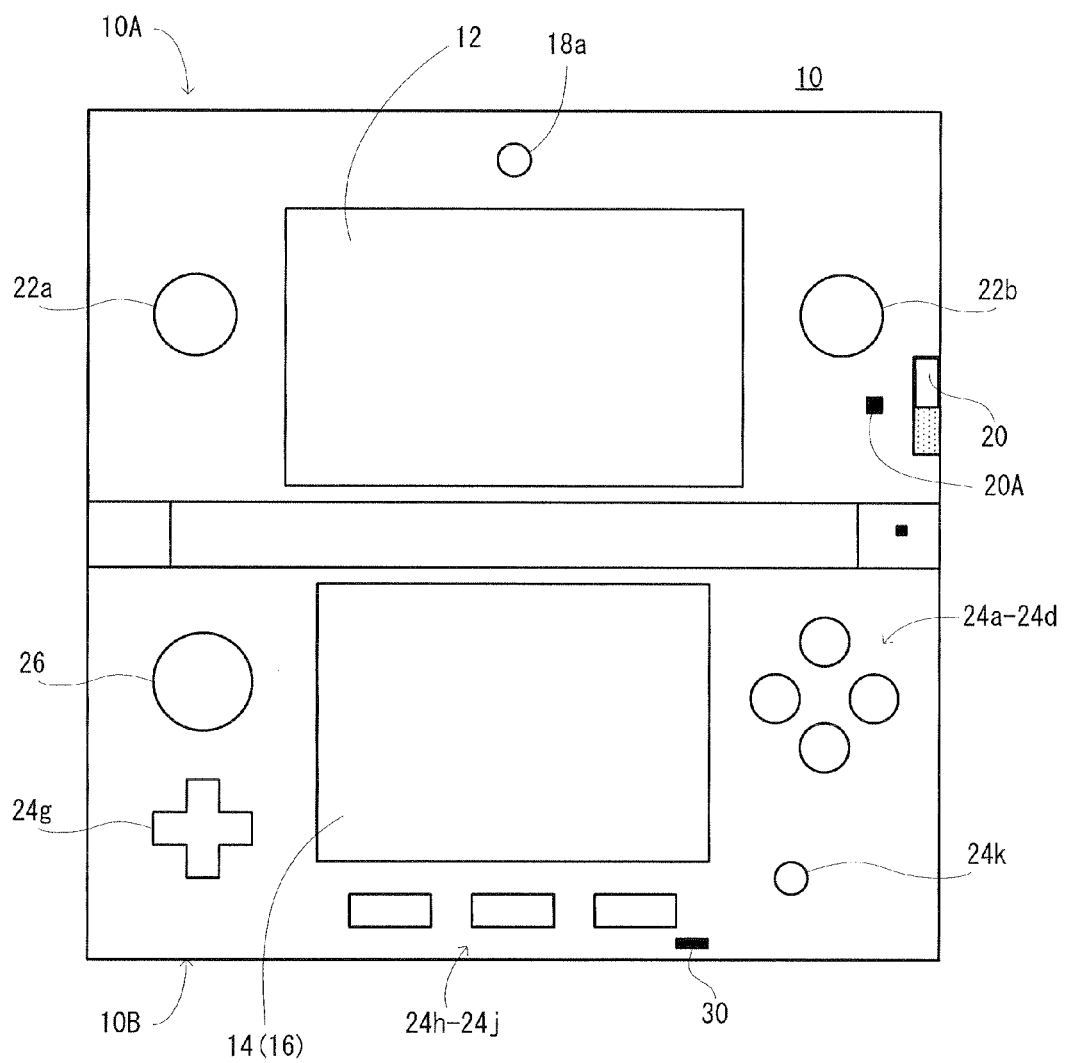
FIG. 1 is an external view of a game apparatus of one embodiment of the present invention, and shows a front surface in an open state.
Figure 2:
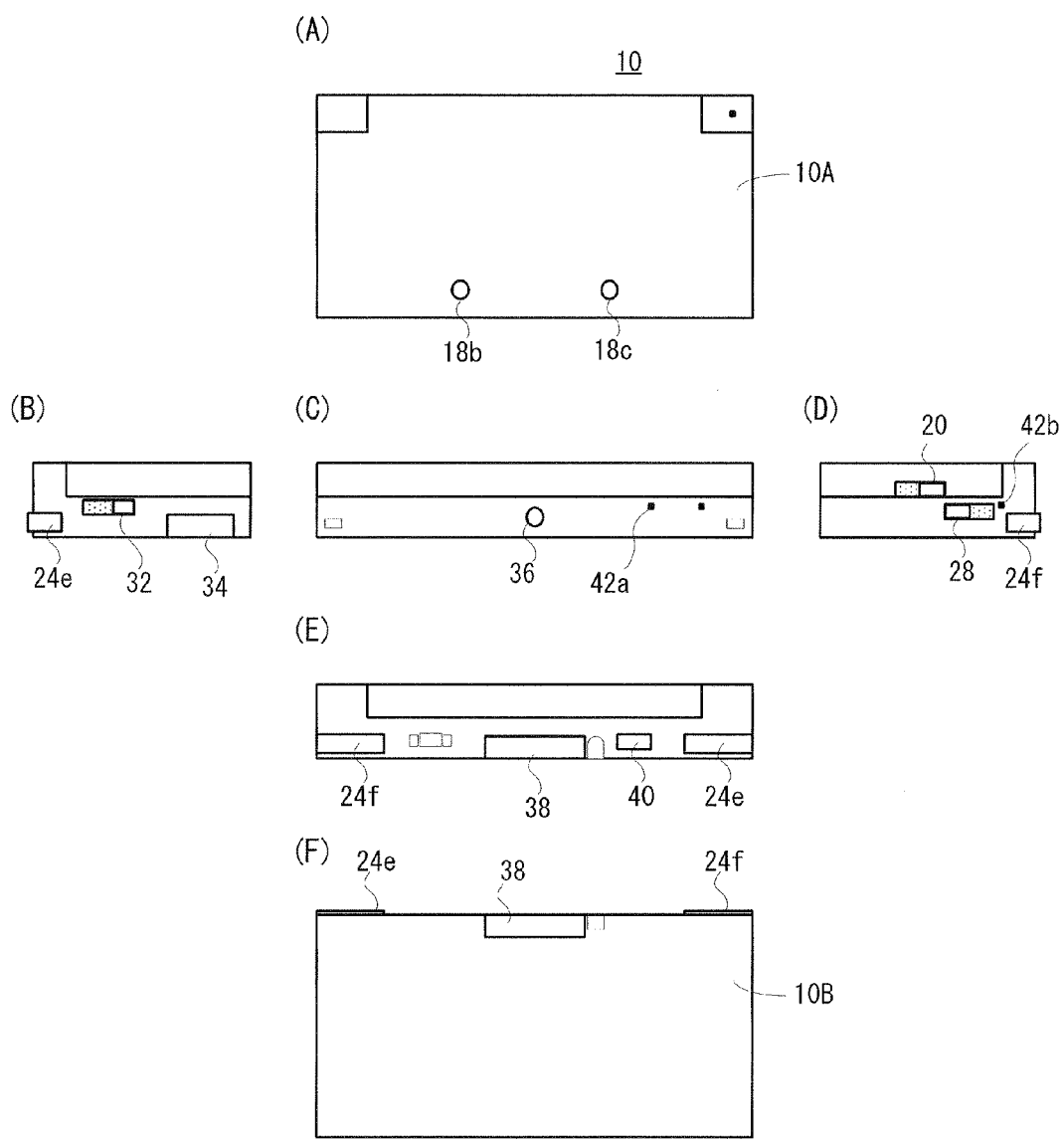
FIG. 2 is an external view of the game apparatus, FIG. 2 (A) shows a top surface in a close state, FIG. 2 (B) shows a left side surface in the close state, FIG. 2 (C) is a front surface in the close state, FIG. 2 (D) is a right side surface in the close state, FIG. 2 (E) shows a back surface in the close state, and FIG. 2 (F) shows a bottom surface in the closed state.

In FIG. 1 and FIG. 2, an appearance of a game apparatus 10 of one embodiment of the present invention is shown. The game apparatus 10 is a foldable game apparatus, FIG. 1 shows a front surface of the game apparatus 10 in an open state, FIG. 2 (A) to FIG. 2 (F) respectively shows a top surface, a left side surface, a front surface, a right side surface, a back surface and a bottom surface of the game apparatus 10 in a closed state.

The game apparatus 10 has an upper housing 10A and a lower housing 10B rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc. are provided. On a top surface of the lower housing 10B, a lower LCD 14 attached with touch panel 16, A, B, X, Y buttons 24a-24d, a cross key (button) 24g, home, select, start buttons 24h-24j, a power button 24k, an analog pad 26, and a microphone 30 are provided.

Furthermore, as shown in FIG. 2 (A), on a top surface of the game apparatus 10 (reverse side of the upper housing 10A shown in FIG. 1), right and left outward cameras 18b and 18c compliant with 3D imaging are provided. Furthermore, as shown in FIG. 2 (C), on a front surface of the game apparatus 10, a headphone terminal 36, a power lamp 42a, etc. are provided. Also, as shown in FIG. 2 (B), FIG. 2 (E) and FIG. 2 (D), from a left side surface to a back surface of the game apparatus 10, an L button 24e is provided, and from a right side surface to a back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are further provided. The above-described 3D adjusting switch 20 is exposed from the right side surface. In addition, on the back surface of the game apparatus 10, an infrared ray emitting-receiving portion 40, etc. is further provided. Then, as shown in FIG. 2 (E) and FIG. 2 (F), from the back surface to a bottom surface, a game card slot 38 is provided.

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereoscopic 3D systems may be adopted without being restricted to the parallax barrier system.

The inward camera 18a images a planar image (2D image) while the outward cameras 18b and 18c image stereoscopic images (3D image). A 2D or 3D image imaging the player can be used as an image input to an application program like a game program. In this case, the game program 72 detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

Figure 3:
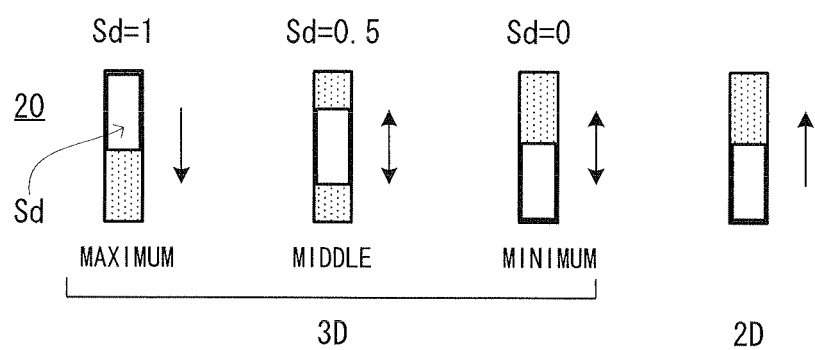
FIG. 3 is an illustrative view for explaining an operation of a 3D adjusting switch.

The 3D adjusting switch 20 manually switches the display of the stereoscopic LCD 12 between the 3D display and the 2D display, and is a slide switch for manually adjusting a three-dimensional effect in the 3D display as well and operates as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved down at the lower end.

Although the detailed description is made later, such a change of the three-dimensional effect of the 3D display is implemented by changing the distance (distance-between cameras D) between the right and left virtual cameras (ICL and ICR: see FIG. 7) arranged within the virtual space (see FIG. 7-FIG. 10). That is, according to an operation of the 3D adjusting switch 20, the distance-between cameras D is adjusted. Then, the distance-between cameras D accepts an automatic adjustment (described later) by the game program as well as the manual adjustment.

The 3D lamp 20A is a lamp showing a displaying condition of the stereoscopic LCD 12, and lights up in the 3D display and light off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a-24d, the cross key (button) 24g, the home, select, start buttons 24h-24j, or the analog pad 26 is used as a touch/button/pad input to the game program. The power button 24k is used for turning on or off the power of the game apparatus 10. The power lamp 42a lights up or off in conjunction with the power-on or the power-off of the power source.

The microphone 30 converts a speech voice by a player, an environmental sound, etc. to sound data. The sound data can be used as a sound input to the game program. In this case, the game program detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game voice, a microphone voice, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for storing a camera image, a microphone sound, etc., and the game card slot 38 is attached with a game card (not illustrated) storing the game program, etc. The infrared ray emitting-receiving portion 40 is utilized for infrared rays (IR) communications with another game apparatus.

Figure 4:
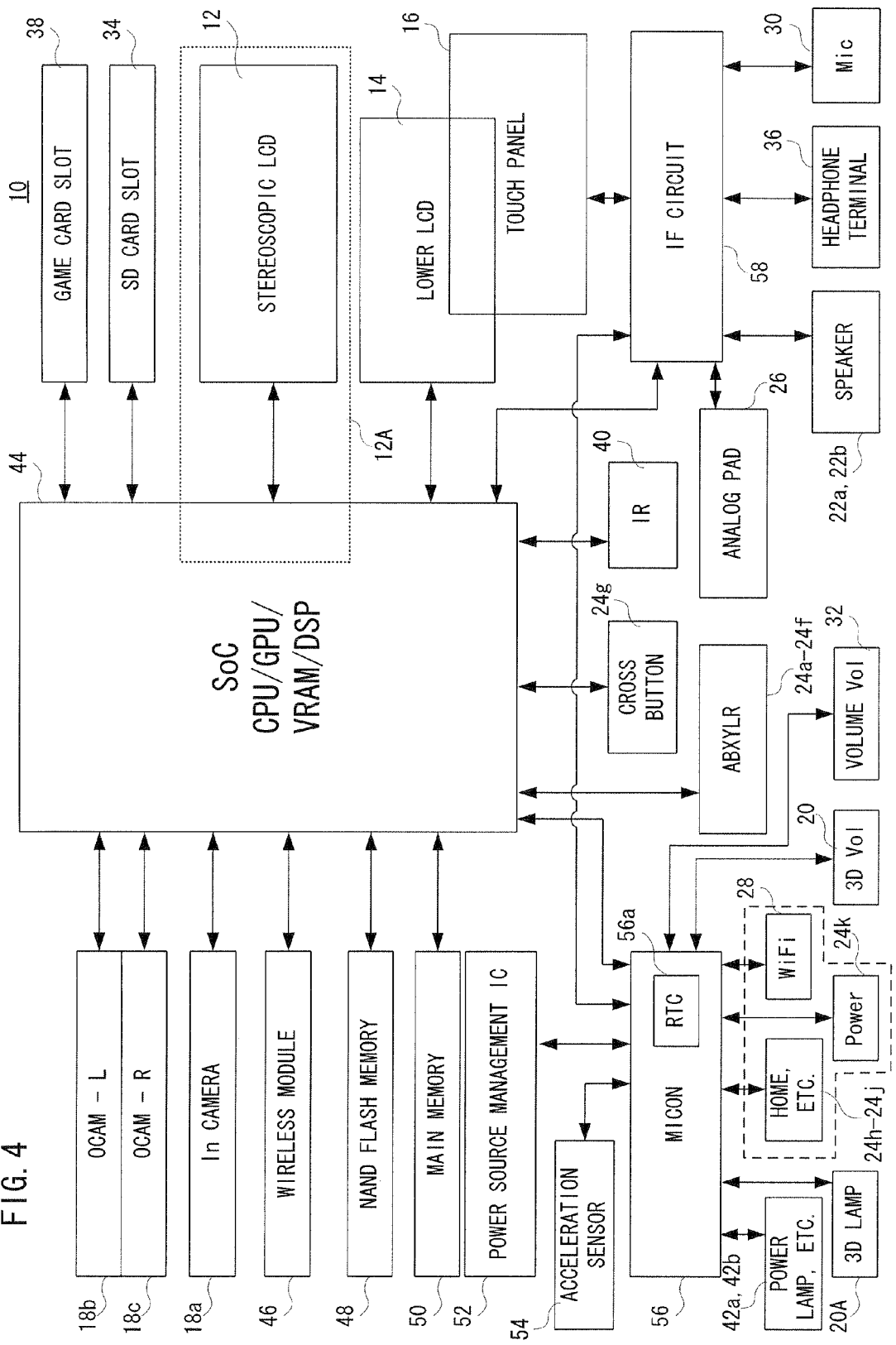
FIG. 4 is a block diagram showing one example of an electric configuration of the game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving portion (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. The NAND-type flash memory 48 stores data for saved, such as a camera image, a microphone voice, etc. The main memory 50 gives a working area to the SoC 44. That is, in the main memory 50, various data and programs to be used in applications, such as a game are stored, and the SoC 44 performs works by utilizing the data and program stored in the main memory 50.

The micon 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result of the acceleration sensor 54 can be used as a motion input to the game program. In this case, the game program calculates a motion of the game apparatus 10 itself on the basis of the detection result, and executes processing according to the calculation result.

Furthermore, the micon 56 includes an RTC (real-time clock) 56*a*, and counts a time by the RTC 56*a* to supply the same to the SoC 44.

Figure 5:
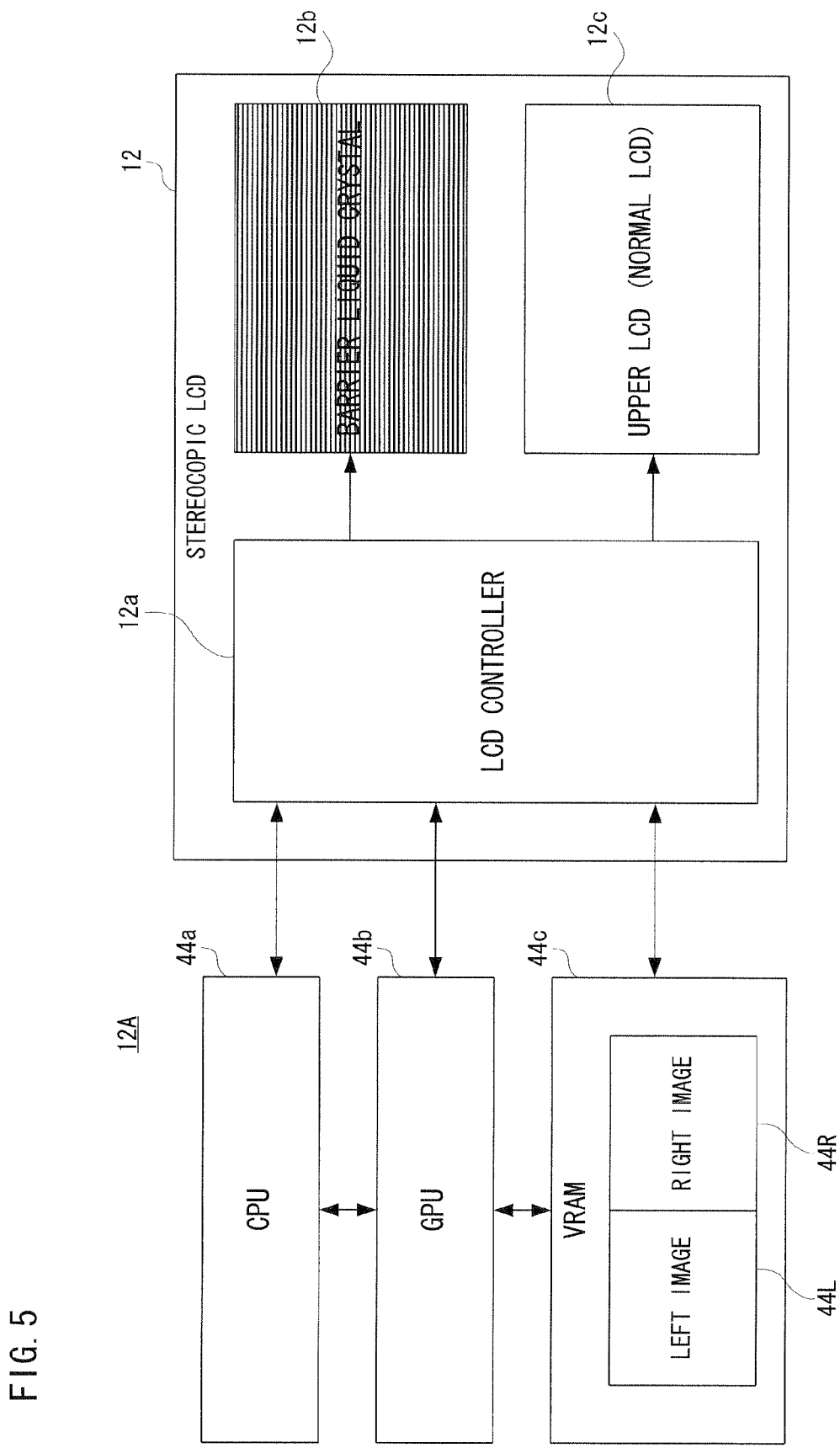
FIG. 5 is a block diagram showing a main part (stereoscopic LCD controller being formed of a stereoscopic LCD and a part of SoC) of the electric configuration in FIG. 4.

FIG. 5 shows a stereoscopic LCD controller 12A being made up of the stereoscopic LCD 12 and a part of the SoC 44. The stereoscopic LCD 12 includes an LCD controller 12*a*, a barrier liquid crystal 12*b* and an upper LCD 12*c*. The barrier liquid crystal 12*b* includes a plurality of liquid crystal slits extending in a vertical (row) direction as shown in FIG. 6(A), and makes the right eye and the left eye view beams passing through pixels in a different row of the upper LCD 12*c* by alternately cutting off the beam from the backlight by the plurality of liquid crystal slits. The upper LCD 12*c* may be a general liquid crystal (for 2D display) similar to the lower LCD 14. The LCD controller 12*a* performs drawing on the upper LCD 12*c* under the control of the GPU 44*b* and then the CPU 44*a*, and turns the barrier liquid crystal 12*b* (applied voltage) on and off. When the barrier liquid crystal 12*b* is turned off, the right eye and the left eye can view the beams passing through the pixels of all the rows on the upper LCD 12*c* as shown in FIG. 6(B).

Figure 7:
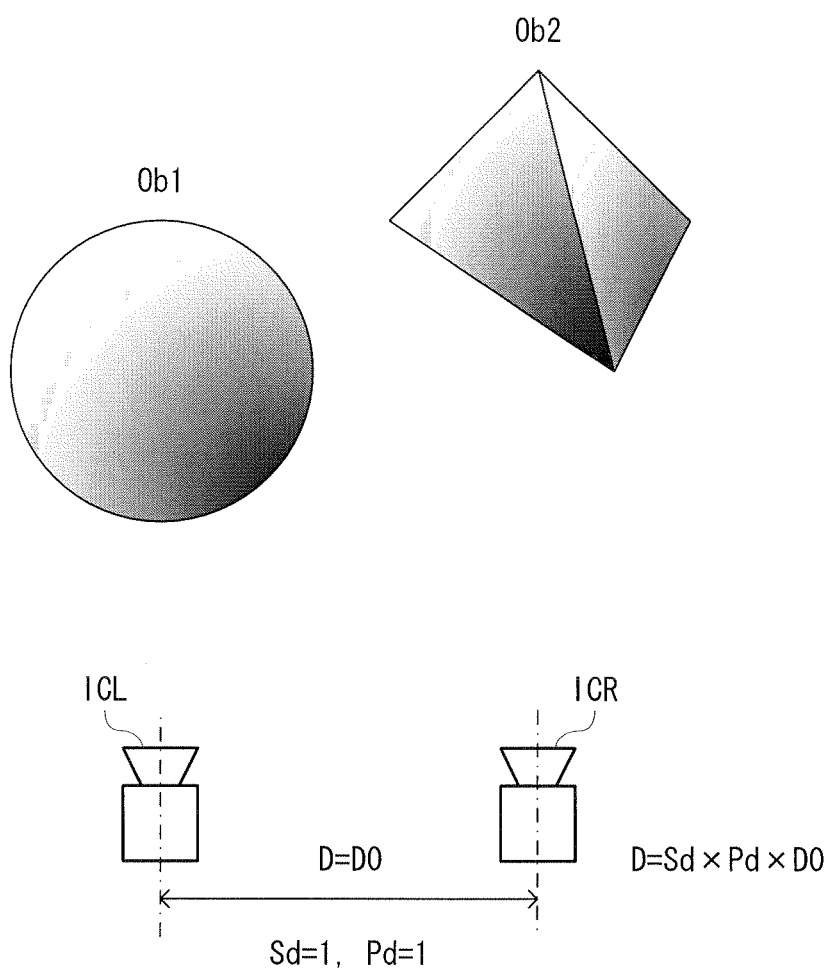
FIG. 7 is an illustrative view showing a situation in which an object is imaged by right and left two virtual cameras in a virtual space.
Figure 8:
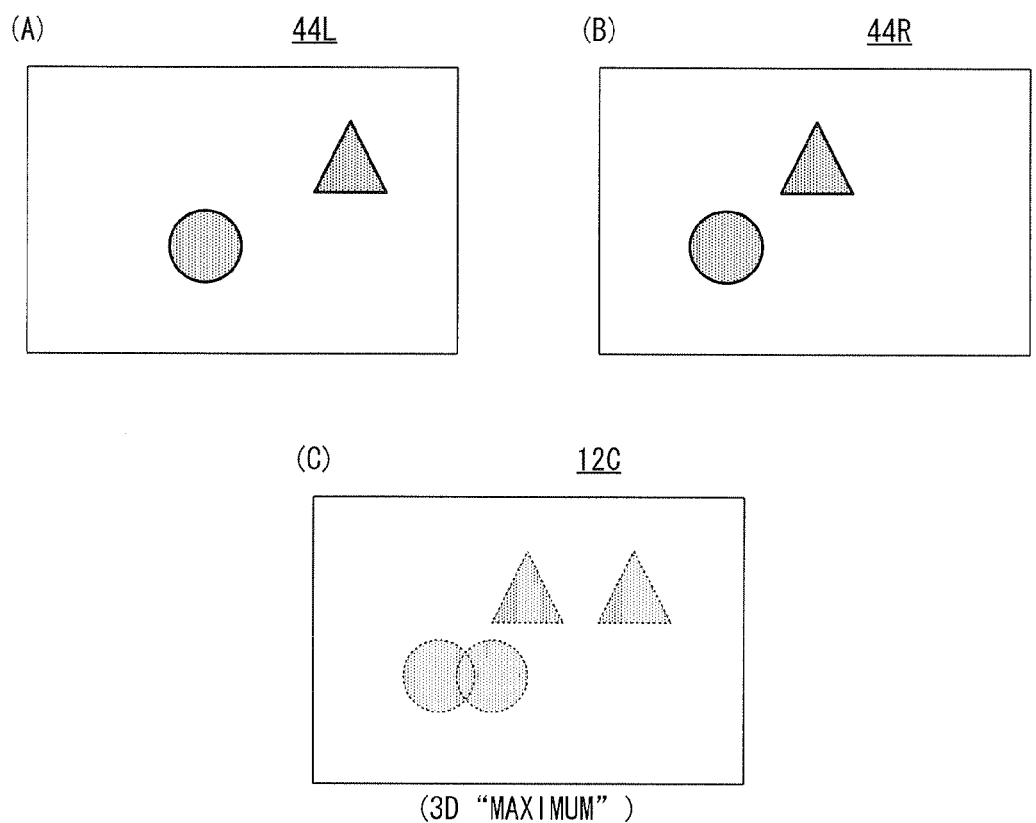
FIG. 8 is an illustrative view showing an imaged image (the distance-between cameras is a maximum value D0) by the two virtual cameras.

More specifically, as shown in FIG. 7, in a case that objects Ob1 and Ob2 are imaged by a left virtual camera ICL and a right virtual camera ICR spacedly arranged right and left (D=D0) within the virtual space, the GPU 44*b* writes a left image 44L and a right image 44R as shown in FIG. 8(A) and FIG. 8(B) to the VRAM 44*c*, and the LCD controller 12*a* alternately reads the left image 44L and the right image 44R stored in the VRAM 44*c* on a row-by-row basis, and draws them in the upper LCD 12*c* in order under the control of the CPU 44*a*. Thus, on the upper LCD 12*c*, a stereoscopic image (for implementing a stereoscopic views) as shown in FIG. 8(C) is displayed. When a backlight beam to the stereoscopic image is limited by the barrier liquid crystal 12*b*, the left eye can view the left image 44L as shown in FIG. 8(A), and the right eye can view the right image 44R as shown in FIG. 8(B), so that autostereoscopy is implemented.

It should be noted that in FIG. 5, the LCD controller 12*a*, the GPU 44*b* and the VRAM 44*c* are provided by being brought into correspondence with the stereoscopic LCD 12, and naturally, an LCD controller, a GPU and a VRAM are provided by being brought into correspondence with the lower LCD 14. As can be understood with reference to FIG. 5, the GPU corresponding to the lower LCD 14 is also connected with the CPU 44*a* so as to transmit and receive a signal, and the GPU and the VRAM that correspond to the lower LCD 14 are connected with each other so as to transmit and receive a signal. Then, each of the CPU 44*a*, and the GPU and the VRAM that correspond to the lower LCD 14 is connected to the lower LCD 14 so as to transmit and receive a signal with the LCD controller, to which the lower LCD 14 is connected.

By the way, as described above, the stereoscopic image in FIG. 8(C) is an image when the distance-between cameras D becomes the maximum (D=D0: see FIG. 7), and it changes from FIG. 9(B) to FIG. 10(B) as the distance-between cameras D is shorter from FIG. 9(A) to FIG. 10(A). The distance-between cameras D is calculated according to the following equation (1).

$$D = Sd \times Pd \times D0 \quad (1)$$

Here, Sd is a variable showing a value of the slider Sd of the 3D adjusting switch 20 shown in FIG. 3, and changes within a range from 0 to 1 in accordance with an operation of the slider Sd ($0 \leq Sd \leq 1$). Pd is a variable to be controlled by the game program 72, and similarly changes within a range from 0 to 1 ($0 \leq Pd \leq 1$). D0 is a constant corresponding to a space between the two pupils of the human, and is set to 65 mm, for example (D0=65 mm).

In each of FIG. 7, FIG. 9(A) and FIG. 10(A), the variable Sd is 1, and the slider Sd is fixed at the upper end (Sd=1). The variable Pd changes as in 1→0.5→0 by the game program 72, so that the distance-between cameras D changes as in D0→(0.5×D0)→0. Then, in correspondence with the change in a direction in which the distance-between cameras D is decreased, the stereoscopic image changes as in FIG. 8(C)→FIG. 9(B)→FIG. 10(B). That is, the parallax between the left image 44L and the right image 44R decreases, and becomes equal to the planar image.

Here, if the variable Sd is fixed at 0.5 (Sd=0.5), the distance-between cameras D changes within the range from 0 to (0.5×D0). Furthermore, if the variable Sd is fixed at 0 (Sd=0), the distance-between cameras D remains 0.

In a case of a state in FIG. 10(A), that is, in a case of the minimum of the 3D display or in a case of the 2D display, the distance-between cameras D becomes 0, so that the left image 44L and the right image 44R which are written to the VRAM 44*c* become the same (that is, the parallax is 0). In this case as well, the LCD controller 12*a* alternately reads the left image 44L and the right image 44R stored in the VRAM 44*c* on a row-by-row basis, and draws them in the upper LCD 12*c* in order. Thus, a planar image (that is, image without parallax) as shown in FIG. 10(B) is displayed on the upper LCD 12*c*. When the barrier liquid crystal 12*b* for restricting the backlight to the stereoscopic image is turned off, the right and left eyes can view the planar image shown in FIG. 10(B).

Here, even if the barrier liquid crystal 12*b* is not turned off at this time, the planar image shown in FIG. 10(B) can still be viewed. It should be noted that when the barrier liquid crystal 12*b* is turned off, a suitable viewing position is extended to make the planar image appear bright. Furthermore, the LCD controller 12*a* may read only one of the left image 44L and the right image 44R in place of alternately reading them and draw it in the upper LCD 12*c*. In this case as well, the planar image as shown in FIG. 10(B) is displayed on the upper LCD 12*c*.

Figure 11:
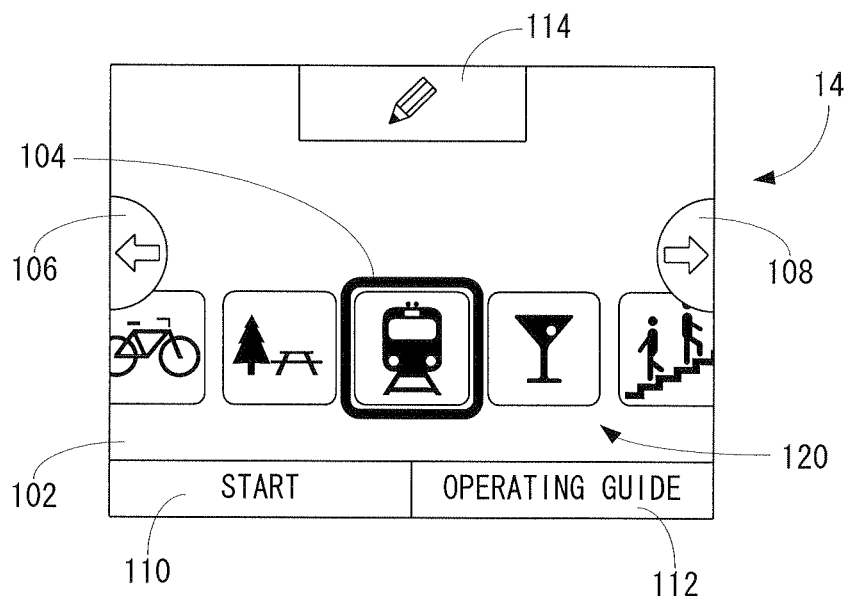
FIG. 11 is an illustrative view showing one example of a main menu screen displayed on the lower LCD shown in FIG. 1.

For example, when the power button 24*k* is turned on to thereby turn the main power supply of the game apparatus 10 on, the game apparatus 10 is activated to display the main menu screen 100 as shown in FIG. 11 on the lower LCD 14. Here, in a case that the home button 24*h* is turned on in a state that the game apparatus 10 is being activated during execution of an application program, such as the game program, etc. as well, the main menu screen 100 is displayed on the lower LCD 14. In this case, an application such as a game, etc. is suspended (paused).

As shown in FIG. 11, on the main menu screen 100, a display region 102 is provided. At the center of the display region 102, a small window 104 of a heavy-line frame is displayed. Furthermore, at the center of the left end of the display region 102 (main menu screen 100), a button image 106 is displayed, and at the center of the right end of the display region 102, a button image 108 is displayed. In addition, at the bottom end of the main menu screen 100 below the display region 102, a button image 110 and a button image 112 are displayed. Then, at the top end of the main menu screen 100 above the display region 102, a button image 114 is displayed.

The display region 102 is a region for displaying an image (icon) 120 as to an application mainly executable by the game apparatus 10. The small window 104 is a designation image for showing the icon 120 which is being selected. The button image 106 is provided to move (scroll) the icon 120 leftward. The button image 108 is provided to scroll the icon 120 rightward.

The button image 110 is provided to designate execution (start) of the application program corresponding to the icon 120 (icon 120 that is being selected) displayed on the small window 104. The button image 112 is provided to designate a display of an operating guide as to the application indicated by the icon 120 displayed on the small window 104. The button image 114 is provided to designate execution of the memo function (memo application). The memo function is explained in detail later.

On the main menu screen 100, when the button image 110 is turned on (touched) in a state that the icon 120 is displayed on the small window 104, the application program corresponding to the icon 120 is executed. Each of FIG. 12(A) and FIG. 12(B) shows, in a case that an application program of a certain virtual game is executed, an example of game screens to be displayed on the stereoscopic LCD 12 and the lower LCD 14 as a result of the execution.

As shown in FIG. 12(A), on the stereoscopic LCD 12, a first game screen 200 is displayed. Furthermore, as shown in FIG. 12(B), a second game screen 250 is displayed on the lower LCD 14. On the first game screen 200, a player object 202, an enemy object 204, a background object 206 and a background object 208 are displayed.

The player object 202 performs an arbitrary action, such as moving according to an operation by a player, attacking on the enemy object 204, and destructing the background objects 206, 208. The enemy object 204 performs an arbitrary action, such as moving according to a control by the computer (CPU 44a) irrespective of an operation by the player, attacking the player object 202 and destructing the background objects 206, 208. The background objects 206, 208 are block objects, for example. For example, the player object 202 and the enemy object 204 can step on the background objects 206, 208, and can destruct (wipe out) the background objects 206, 208.

For example, the virtual game is an action game, and the player object 202 moves within the virtual space by defeating a plurality of enemy objects 204, wards off an attack from the enemy object 204, etc. Furthermore, when the player object 202 reaches the goal of the course within a time limit, the course is cleared. Then, when the player object 202 reaches the goals of all the courses, the game is cleared.

Here, in a case that the player object 202 cannot reach the goal of the course within the time limit, in a case that the player object 202 is attacked by the enemy object 204, or in a case that the player object 202 is out of the course by falling into the hall, the player object 202 annihilates, and when the remaining number of player objects 202 becomes zero, the game is over.

On the second game screen 250 shown in FIG. 12(B), a game map 252 is displayed. The game map 252 shows connections between respective courses (A1, A2, A3, A4 and A5, here). For example, with respect to the game map 252, the course A1 is cleared to thereby proceed to the course A2, the course A2 is cleared to thereby proceed to the course A3 or the course A4, and the course A3 or the course A4 is further cleared to thereby proceed to the course A5.

Furthermore, at the upper right end of the second game screen 250, a display region 254 is provided. The display region 254 is a region to display a design 2540 of an item possessed by the player object 202. For example, during the game, when the design 2540 of the item displayed in the display region 254 is touched, the item is made useable.

Thus, the ability of the player object 202 is changed. For example, the offensive power (punching force, kicking force, jumping force, etc.) of the player object 202 is increased, the moving velocity of the player object 202 is increased, the player object 202 becomes invincible, the player object 202 can use a firearm, and so forth.

Here, when the item is used, the item image 2540 is erased from the display region 254. Furthermore, the item can be acquired within the course.

Furthermore, although explanation is omitted, in a case that another kind of the virtual game and an application program except for the virtual game is executed, the processing corresponding to the application is executed, and the result of the execution is displayed on at least any one of the stereoscopic LCD 12 and the lower LCD 14.

In the game apparatus 10 of this embodiment, it is possible to make a memo during the virtual game (during execution of the application). For example, use at a time when the player wants to make a memo of a method of capturing the virtual game, of a spell (encryption), key words is conceivable. Here, what kind of memo is to be remained and how the memo function is to be used are decided by the player's own will. This holds true for a case that an application except for the virtual game is executed.

As described above, when the home button 24h is turned on, the game processing is paused to thereby display the main menu screen 100 shown in FIG. 11 in front of the second game screen 250 on the lower LCD 14. At this time, the screens (first game screen 200 and second game screen 250, here) as to another application program (application program of the virtual game, for example) are captured. Here, the other application program is other application programs except for the memo application program. This holds true for the specification hereunder. Furthermore, the screen of the other application to be captured is a screen displayed when or immediately before the home button 24h is turned on.

When the button image 114 is touched on the main menu screen 100, execution of the memo application program is designated. Thereupon, the memo application program is executed (started). When the memo application program is started, a captured screen 300 as shown in FIG. 13(A) is displayed on the stereoscopic LCD 12, and a list of memo screen 350 as shown in FIG. 13(B) is displayed on the lower LCD 14.

On the captured screen 300 shown in FIG. 13(A), a first captured image 302 is displayed. The first captured image 302 is an image obtained by capturing the screen displayed on the stereoscopic LCD 12 (first game screen 200, here) when or immediately before the home button 24h is turned on as described above.

On the list of memo screen 350 shown in FIG. 13(B), a plurality of display frames 352 (16 in this embodiment) are provided, and in each of the display frame 352, a reduced image (thumbnail) of a memo or a blank image in which a memo is not created is displayed. Here, in FIG. 13(B), for simplicity, as thumbnails of memos, characters of a memo 1, a memo 2, a memo 3, a memo 4 and a memo 5 are shown. Furthermore, in the list of memo screen 350, a button image 354 is displayed below the plurality of display frames 352.

When the display frame 352 in which a blank image is displayed is touched on the list of memo screen 350, a designation of creating a new memo is applied, to thereby display a captured screen 300 as shown in FIG. 14(A) on the stereoscopic LCD 12 and a memo creating screen 400 as shown in FIG. 14(B) on the lower LCD 14.

Although illustration is omitted, when the display frame 352 in which a thumbnail of a memo is displayed is touched on the list of memo screen 350, a designation of editing a memo is applied, and an original image of the memo corresponding to the thumbnail is displayed on the memo creating screen 400 displayed in the display region 402.

Here, in a case that a designation of editing a memo is applied as well, the captured screen 300 as to the image currently captured (currently captured image) is displayed on the stereoscopic LCD 12 as shown in FIG. 14(A). Alternatively, when a memo is edited, the captured image stored together with the memo may be displayed on the stereoscopic LCD 12. In such a case, the stored captured image and the currently captured image may be made switchable.

The captured screen 300 shown in FIG. 14(A) is approximately the same as the captured screen 300 shown in FIG. 13(A), but a title displaying image 310 is displayed at the bottom portion of the screen in front of the first captured image 302. The title displaying image 310 is displayed at the foremost of the stereoscopic LCD 12 only for a predetermined time (3 to 5 seconds, for example) in a case that a memo creating designation, a memo editing designation, and a captured image switching designation are input. This is because that a memo about which tile (application) is created (edited) is informed to the player, and the kind of the displayed captured image (or, switch of the captured image) is notified to the player as described later.

As shown in FIG. 14(A), the title displaying image 310 is made up of an application-specific image (hereinafter referred to as "specific image") 312, a text image of the title 314 and a kind image of the captured image (hereinafter referred to as "kind image") 316. The specific image 312 is displayed at the left end of the title displaying image 310, and indicates the kind of the title, that is, the application. Accordingly, in the game application, for example, a facial image of a hero of the virtual game may be set to the specific image 312. The text image 314 is an image displayed between the specific image 312 and the kind image 316, and representing a name (content) of the application (title) in text form. The kind image 316 is displayed at the right end of the title displaying image 310, and is an image representing the kind of the captured image (or, switch of the captured image) displayed on the stereoscopic LCD 12.

In this embodiment, the kind of the captured image is a captured image of the screen displayed on the stereoscopic LCD 12 (hereinafter referred to as, "first captured image"), a captured image of the screen displayed on the lower LCD 14 (hereinafter referred to as, "second captured image"), and an image in which the first captured image and the second captured image are displayed so as to be vertically arranged (collectively) in a reduced-size (hereinafter referred to as, "third captured image"). For example, in a case that the third captured image is displayed, each of the first captured image and the second captured image is reduced such that the longitudinal length is halved.

Although detailed explanation is omitted, as a method of reducing the captured image, a bilinear method is adopted. Here, in place of the bilinear method, a nearest-neighbor method and a bicubic method may be adopted. These are all well-known methods, and the explanation thereof is omitted.

Although it is difficult to understand from FIG. 14(A), the kind image 316 is an image for representing the game apparatus 10, and has a partial image 316a corresponding to the stereoscopic LCD 12 and a partial image 316b corresponding to the lower LCD 14. For example, in a case that the partial image 316a is emphasized, the captured screen 300 as to the first captured image 302 is displayed on the stereoscopic LCD 12. Furthermore, in a case that the partial image 316b is emphasized, the captured screen 300 as to a second captured image 304 is displayed on the stereoscopic LCD 12 (see FIG. 15(B)). Then, in a case that both of the partial image 316a and the partial image 316b are emphasized, the third captured image (reduced images of the first captured image 302 and the second captured image 304) is displayed on the stereoscopic LCD 12 (see FIG. 16(A)).

Although detailed explanation is omitted, in a case that the partial images 316a, 316b are emphasized, brightness may be heightened or a color different from the other parts may be given. In the drawings (FIG. 14(A), FIG. 15(B), FIG. 16(A)), that the partial image (316a, 316b) is emphasized is shown by slanted line.

Here, the switch of the captured image is performed by touching a button image 414 as described later.

As shown in FIG. 14(B), on the memo creating screen 400, a display region 402 is provided. Furthermore, on the memo creating screen 400, a button image 404, a button image 406, a button image 408, a button image 410, a button image 412, the button image 414 and a button image 416 are displayed at the bottom portion.

The display region 402 is a region for creating a memo by the player, and is specifically a region in which a character, a design, a symbol, an image (handwriting image), etc. are depicted by using the pen. In a case that a pen tool is selected, for example, when a touch is made on the display region 402 with the pen or the finger, a point is depicted at the touched position. Successively, when the pen or the finger is moved (slid), that is, when the display region 402 is traced, a character, etc. (line 430 here) is depicted according to the moving trajectory by the pen and the finger (pen, here) as shown in FIG. 15(A). Here, the color of the depicted line is selected by the button image 406-410 as described later.

The button image 404 is provided for returning to the list of memo screen 350. The button images 406, 408, 410 are provided for selecting the pen tool. As described above, in correspondence with the touched button image 406-410, the color of the depicted point and line can be selected. In this embodiment, when the button image 406 is touched, black is selected. When the button image 408 is touched, red is selected. When the button image 410 is touched, blue is selected.

Here, in FIG. 14(B), in order to represent a difference in color, a numerical value is described in the button image, but in reality, a color set to each pen tool is given to the image of the pencil.

The button image 412 is provided for selecting an eraser tool. In a case that the eraser tool is selected, when the display region 402 is traced with the pen or the finger, the character, etc. depicted at the traced portion is erased.

The button image 414 is provided for switching the captured images. In this embodiment, when the display frame 352 in which the thumbnail or the blank image is displayed is touched in the list of memo screen 350 to thereby display the memo creating screen 400 on the lower LCD 14 as shown in FIG. 14(B), the captured screen 300 as to the first captured image 302 is displayed on the stereoscopic LCD 12.

When the button image 414 is touched once in this state, the captured screen 300 as to the second captured image 304 is displayed on the stereoscopic LCD 12 as shown in FIG. 15(B). When the button image 414 is touched once in this state, the captured screen 300 as to a third captured image 306 is displayed on the stereoscopic LCD 12 as shown in FIG. 16(A). When the button image 414 is further touched once in this state, the captured screen 300 as to the first captured image 302 is displayed on the stereoscopic LCD 12 as shown in FIG. 14(A). Every time that the button image 414 is touched hereafter, the captured image is sequentially changed (switched) as described above. Furthermore, as shown in FIG. 14(A), FIG. 15(B) and FIG. 16(A), every time that the captured image is switched, the above-described title displaying image 310 is displayed for a predetermined time.

Returning to FIG. 14(B), the button image 416 is provided for selecting a menu. In this embodiment, it is possible to select to store the memo created by the menu, or erase the created memo (clear all). When the button image 416 is touched, a button image 418 is displayed at the foremost of the display region 402 in relation to the button image 416 as shown in FIG. 16(B). The button image 418 includes an operating region 4180 and an operating region 4182. When the operating region 4180 is touched, storing the memo can be selected, and thus, the created memo is stored as an image (memo image) in the NAND flash memory 48. Furthermore, when the operating region 4182 is touched, clearing of all the memos can be selected, and thus, all the created memos are erased. That is, the display region 402 returns to the blank state.

Although illustration is omitted, when the application program of the memo is executed during execution of another application program as described above, the task executing the other application program is paused. That is, the task of the other application and the task of the memo application are activated, but the task of the other application is paused. Therefore, the screen of the memo application (the list of memo screen 350 and the memo creating screen 400) is displayed on the lower LCD 14. For example, the screen of the memo application is displayed in front of the screen of the paused other application (second game screen 250, for example). Or, when the screen of the memo application is displayed, the screen of the other application is undisplayed. That is, in a case that the display image data for each application is developed in a different layer, the layer is switched. Furthermore, in a case that the display image data for each application is developed in the different area of the VRAM, the area to be read is switched. This holds true for switching the application.

Thus, in a case that the two application programs are executed to thereby activate both of the tasks, when the home button 24h is operated (turned on) two successive times, the application to be operated (executed) can be switched. That is, as described above, in a case that the task of the other application is paused, and the task of the memo application is being executed, when the home button 24h is turned on two successive times, the task of the memo application is paused, and the task of the other application is restarted (executed). That is, the application to be operated (executed) is switched. Accordingly, the screen of the other application is displayed on the lower LCD 14.

On the other hand, in a case that the task of the other application is being executed, when the home button 24h is turned on two successive time, the task of the other application is paused, and the task of the memo application is restarted (executed). That is, the application to be operated (executed) is switched. Thus, the screen of the memo application is displayed on the lower LCD 14.

Figure 17:
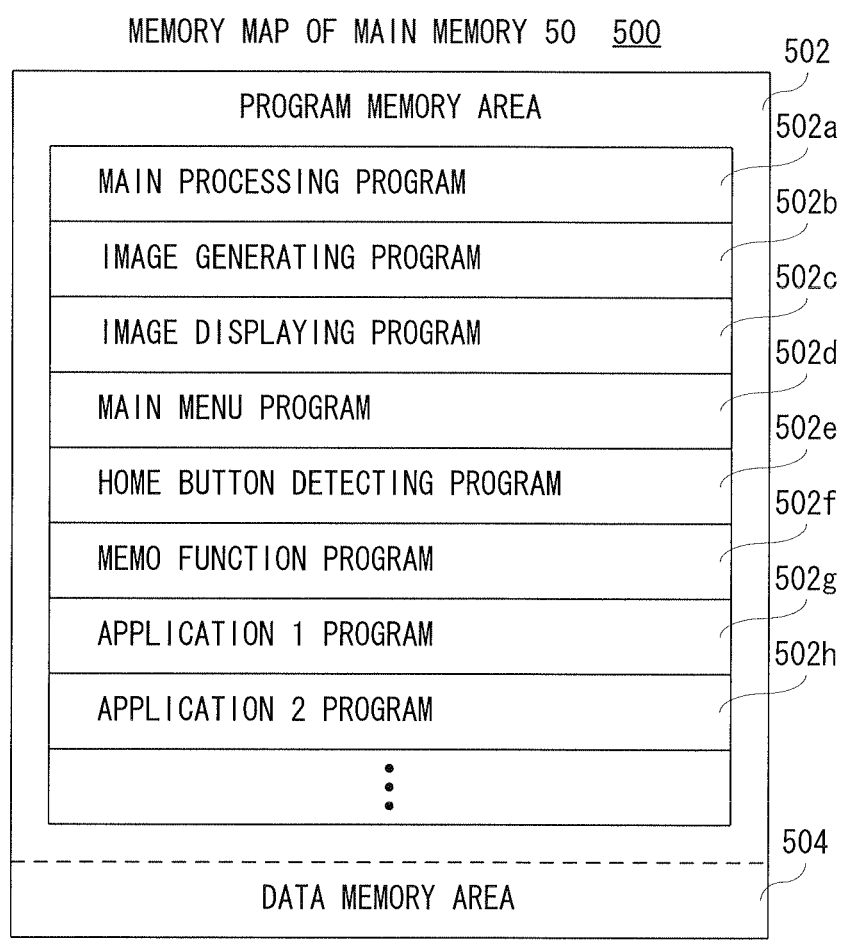
FIG. 17 is an illustrative view showing one example of a memory map of a main memory shown in FIG. 4.

FIG. 17 shows an example of a memory map 500 of the main memory 50 shown in FIG. 4. As shown in FIG. 17, the main memory 50 includes a program memory area 502 and a data memory area 504. The program memory area 502 stores an information processing program and one or a plurality of application programs. The information processing program includes a main processing program 502a, an image generating program 502b, an image displaying program 502c, a main menu program 502d, a home button detecting program 502e, a memo function program 502f, etc. Furthermore, in the program memory area 502, an application 1 program 502g, an application 2 program 502h, etc. are stored.

The main processing program 502a is a program for processing a main routine of the information processing of the game apparatus 10. The image generating program 502b is a program for generating display image data to display various screens (100, 200, 250, 300, 350, 400, etc.) by utilizing image element data 504d, memo 1 data 504g and memo 2 data 504h, etc. described later. The image displaying program 502c is a program for displaying the display image data generated according to the image generating program 502b on the stereoscopic LCD 12 and the lower LCD 14. The main menu program 502d is a program for executing main menu processing.

The main menu processing is to scroll the icon 120 according to an operation by the player, designate execution of the memo function (memo application) and another application, and display an explanation of the other application on the main menu screen 100.

The home button detecting program 502e is a program for determining whether or not the home button 24h is turned on, and shifting to the main menu processing, restarting the paused application, and switching the applications in a case that the home button 24h is turned on. The memo function program 502f is a program for executing creation of a memo, storing of a memo, editing of a memo, erasure of a memo, switch of captured images, etc.

For example, the main processing program 502a, the image generating program 502b, the image displaying program 502c, the main menu program 502d, the home button detecting program 502e and the memo function program 502f are loaded into the main memory 50 from the NAND flash memory 48 when the main power supply of the game apparatus 10 is turned on. Here, the memo function program 502f may be loaded into the main memory 50 in a case that the execution of the memo function is designated on the main menu.

The application 1 program 502g is a program as to an application 1. The application 2 program 502h is a program as to an application 2. Each of the application 1 and the application 2 is an arbitrary application of the virtual game, etc., and means another application except for the memo application (memo function program 5020 in this embodiment. Furthermore, the application 1 program 502g and the application 2 program 502h are loaded from an SD card attached to the SD card slot 34, a game card attached to the game card slot 38 or the NAND flash memory 48, or downloaded into a server through access points and the Internet although not shown to be stored in the main memory 50. Accordingly, the application program of the other application except for the memo application may not be stored in the program memory area 502.

Although illustration is omitted, in the program memory area 502, the other application program, a backup program, a sound output program, etc. are also stored. The other application program is a program as to an arbitrary application similar to the application 1 program 502g and the application 2 program 502h. The backup program is a program for storing (saving) data such as game data, memo data, etc. (proceeding data, result data) in the SD card attached to the SD card slot 34 and the NAND flash memory 48. The sound output program is a program for outputting sound (music) necessary for the game processing and the information processing by utilizing sound data not shown.

Figure 18:
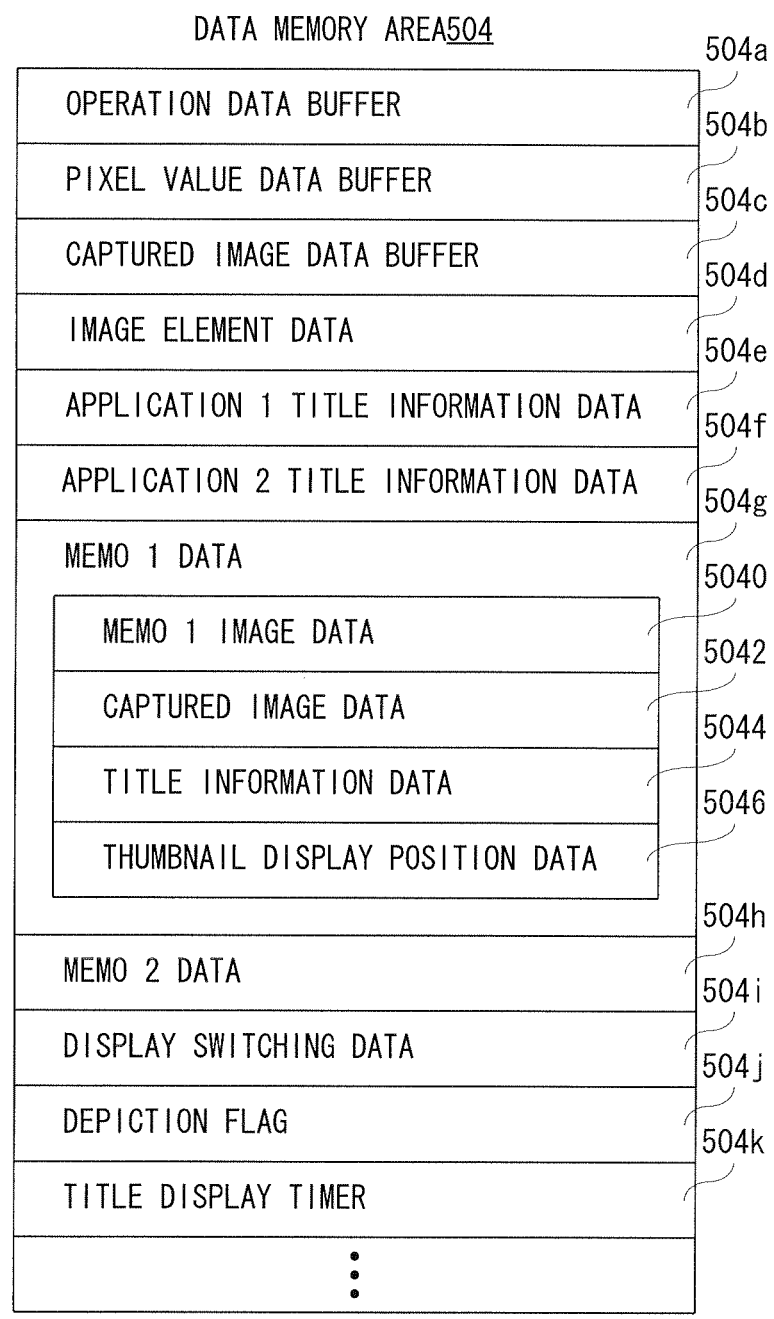
FIG. 18 is an illustrative view showing a specific content of a data memory area shown in FIG. 17.

As shown in FIG. 18, in the data memory area 504, an operation data buffer 504*a*, a pixel value data buffer 504*b* and a captured image data buffer 504*c* are provided.

The operation data buffer 504*a* stores (temporarily stores) operation data (coordinate data) from the touch panel 16 and operation data from the A, B, X, Y buttons 24*a* to 24*d*, the L button 24*e*, the R button 24*f*, the cross key (button) 24*g*, the home, select, start buttons 24*h* to 24*j*, and the analog pad 26. The operation data temporarily stored in the operation data buffer 504*a* is used in the processing by the CPU 44*a*, and erased.

The pixel value data buffer 504*b*, when the player depicts a point and a line at a time of creating a memo, stores (temporarily stores) data as to a pixel value (color) of each of the dots making up of the depicted point (dot) and the depicted line.

Here, the image data (original image data) of an image of a memo (memo image) which the player creates is coordinate data temporarily stored in the operation data buffer 504*a* and the pixel value data corresponding thereto. Thus, in a case that storing the memo is designated, the original image data of the memo image (coordinate data and pixel value data) and the image data (reduced image data) of the thumbnail of the memo image are stored in the NAND flash memory 48 as memo image data (memo 1 image data 5040, etc). Furthermore, in a case that erasure of the memo is designated, the coordinate data as to the dot for which erasure is designated and the pixel value data corresponding thereto are erased. Here, in a case that clear of all the memo is designated, all the coordinate data and all the pixel value data are erased.

The captured image data buffer 504*c* stores (temporarily stores) image data of a captured image (first captured image 302 and the second captured image 304). In this embodiment, the image data of the captured image (captured image data) temporarily stored in the captured image data buffer 504*c* is, when the memo image data is stored in the NAND flash memory 48, similarly stored in the NAND flash memory 48 by being brought into association with the memo image data. Here, in a case that the memo image data was not stored, the captured image data temporarily stored in the captured image data buffer 504*c* is erased.

Furthermore, in the data memory area 504, image element data 504*d*, application 1 title information data 504*e*, application 2 title information data 504*f*, memo 1 data 504*g*, memo 2 data 504*h*, display switching data 504*i* are stored.

The image element data 504*d* is data as to an element of the image to be used when the display image data, such as polygon data, texture data, the data of various button images (110-114, 354, 404-418, etc.) and the kind image 316 is generated.

The application 1 title information data 504*e* is data as to title information of the application 1. In this embodiment, the application 1 title information data 504*e* is data for generating (displaying) the above-described title displaying image 310 and is specifically image data of the specific image 312 and the text image 314 as to the application 1.

The application 2 title information data 504*f* is data as to the title information of application 2 similar to the application 1 title information data 504*e*, and is specifically the image data of the specific image 312 and the text image 314 as to the application 2.

Although detailed explanation is omitted, in a case that three or more application programs are stored in the program memory area 502, the title information data corresponding thereto is also stored in the data memory area 504. Furthermore, the title information data is, when storing a memo is designated, also stored in the NAND flash memory 48 by being brought into associated with the memo image data (coordinate data and pixel value data).

The memo 1 data 504*g* is data as to the memo 1 (memo data), and includes memo 1 image data 5040, captured image data 5042, title information data 5044, and thumbnail display position data 5046.

The memo 1 image data 5040 is original image data and reduced image data as to the memo image created by the player as described above. The captured image data 5042 is image data of the captured image (first captured image 302 and second captured image 304) as to the application paused at a time of creating a memo. The title information data 5044 is title information data as to the application paused at a time of creating a memo. The thumbnail display position data 5046 is data as to display positions (position coordinates, for example) for displaying thumbnails corresponding to the reduced image data included in the memo 1 image data 5040 when the list of memo screen 350 shown in FIG. 13(B) is displayed. Here, in a case that identification information is assigned to each of the display frames 352 of the list of memo screen 350, the identification information may be stored as thumbnail display position data 5046. In this case, data of a display position (position coordinates) of each display frame 352 is separately stored by being correspondence with identification information of each display frame 352.

The memo 2 data 504*h* is data as to the memo 2 (memo data) different from the memo 1, and the detailed content is similar to that of the memo 1 data 504*g*, and thus, an redundant explanation is omitted.

Furthermore, the example of the data memory area 504 shown in FIG. 18 shows a case that two memo data (memo 1 data 504*g*, memo 2 data 504*h*) are stored, but the memo data is stored in the data memory area 504 by the number of them that is stored in the NAND flash memory 48. In this embodiment, a maximum of 16 memos can be stored, and thus, in the data memory area 504*b* as well, a maximum of 16 memo data can be stored. For example, the memo data is loaded into the data memory area 504 when the execution of the memo function is designated. Here, the memo data may be loaded into the data memory area 504 when the main power supply of the game apparatus 10 is turned on.

The display switching data 504*i* is data indicating the kind of the captured image displayed on the stereoscopic LCD 12 in a case that a message is created and edited. For example, the display switching data 504*i* is constructed of a three bit register. The highest-order bit stores data indicating whether the third captured image 306 is to be displayed, the middle-order bit stores data indicating whether or not the second captured image 304 is to be displayed, and the lowest-order bit stores data indicating whether or not the first captured image 302 is to be displayed. To each bit, "1" or "0" is set as a data value. In a case that the data value "1" is set to the bit, a corresponding captured image (302, 304, 306) is displayed. On the contrary thereto, in a case that the data value "0" is set to the bit, a corresponding captured image (302, 304, 306) is not displayed. Here, the data value "1" is set to any one of the bits, and the data value "0" is set to the other bits. Accordingly, at the beginning of creating and editing a message, the lowest-order bit is set to the data value "1". Every time that the button image 414 is touched (turned on), the bit to which the data value "1" is set is continuously changed (shifted) from the middle-order bit, the highest-order bit, the lowest-order bit, . . . . Thus, as described above, on the captured screen 300 displayed on the stereoscopic LCD 12, the captured image (302, 304, 306) is switched.

In addition, in the data memory area 504, a depiction flag 504*j* and a title display timer 504*k* are provided. The depiction flag 504*j* is a flag for determining whether or not a character, etc. is to be depicted in a case that the memo is created, and is constructed of one bit register. In a case that the character, etc. is depicted, the depiction flag 504*j* is turned on, and a data value "1" is set to the register. On the other hand, in a case that the character, etc. is not depicted, the depiction flag 504*j* is turned off, and a data value "0" is set to the register.

Here, in a case that an operated position indicated by the operation data (coordinate data) from the touch panel 16 is within the display region 402 in a state that the pen tool is selected in response to a touch of the button image 406, 408, 410, it is determined a depiction is being performed. On the other hand, in a case that the coordinate data from the touch panel 16 is not input, in a case that the eraser tool is selected in response to a touch of the button image 412, and in a case that the operated position indicated by the coordinate data is within the display region (operating region) of the button images 404-418, it is determined that a depiction is not being performed.

The title display timer 504*k* is a timer for counting a predetermined time during which the title displaying image 310 is displayed, and is reset and started every time that creating and editing a message is designated, or switching the captured image is designated.

Here, in the data memory area 504, other data (sound data, etc.) required for information processing and application processing is stored, and other flags and timers required for the information processing and the application processing are also provided.

Figure 19:
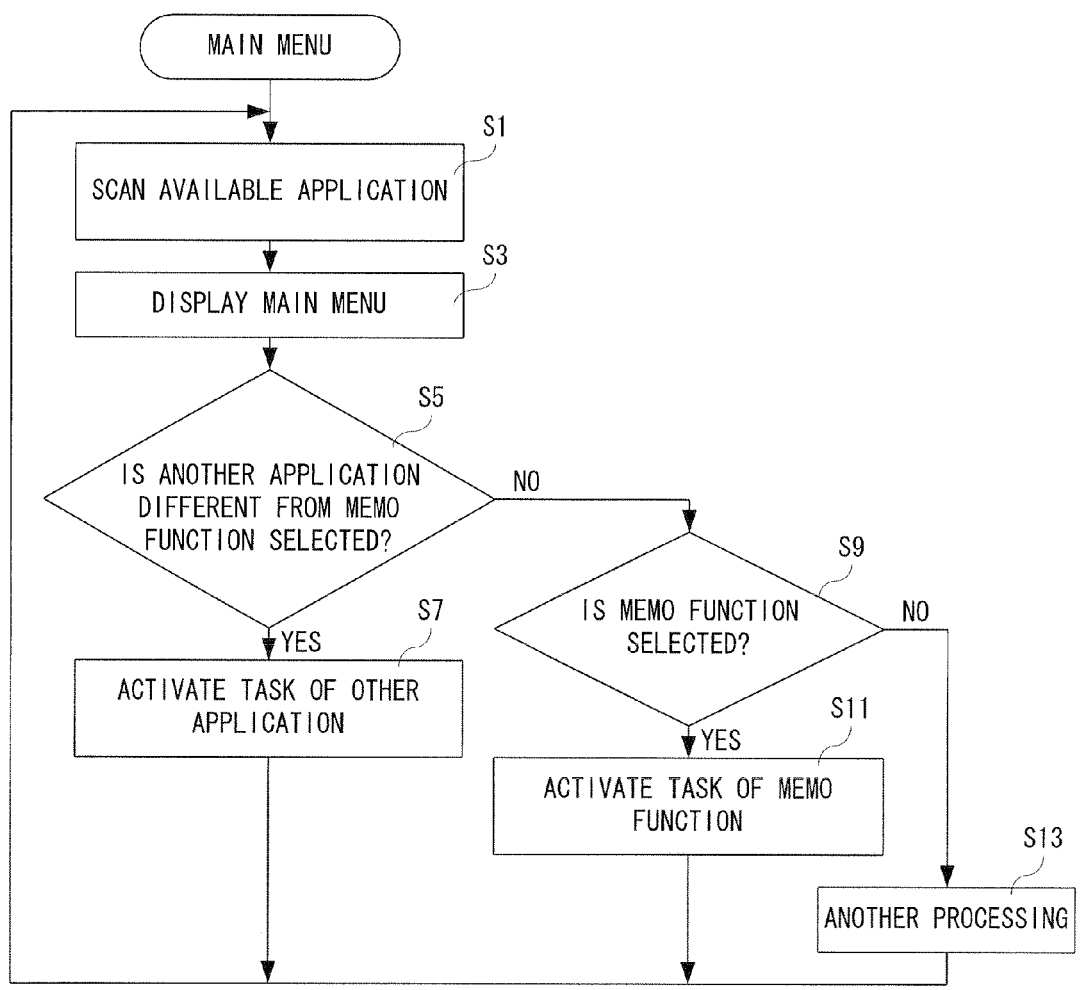
FIG. 19 is a flowchart showing main menu processing by a CPU shown in FIG. 4.

FIG. 19 is a flowchart showing main menu processing by the CPU 44*a* shown in FIG. 4. When a task of the main menu is activated, the CPU 44*a* starts the main menu processing, and scans an available application in a step S1. Here, the CPU 44*a* reads the application program from the SD card and the game card, and reads the application program stored in the NAND flash memory 48.

In a next step S3, the main menu is displayed. That is, the CPU 44*a* displays the main menu screen 100 as shown in FIG. 11 on the lower LCD 14. In a succeeding step S5, it is determined whether or not another application different from the memo function is selected. That is, the CPU 44*a* determines whether or not the button image 110 is touched on the main menu screen 100.

If "YES" in the step S5, that is, if the button image 110 is touched, it is determined that another application different from the memo function is selected, the task of the other application is activated in a step S7, and the process returns to the step S1. For example, the other application is a virtual game, and the CPU 44*a* executes the processing of the selected virtual game in parallel with the main menu processing. The virtual game processing (see FIG. 20) is described later.

On the other hand, if "NO" in the step S5, that is, if the button image 110 is not touched, it is determined that another application different from the memo function is not selected, and it is determined whether or not the memo function is selected in a step S9. That is, the CPU 44*a* determines whether or not the button image 114 is touched on the main menu screen 100.

If "YES" in the step S9, that is, if button image 114 is touched, it is determined that the memo function is selected, a task of the memo function is activated in a step S11, and the process returns to the step S1. Accordingly, the CPU 44*a* executes processing of the memo function (memo application) in parallel with the main menu processing. The memo function processing (FIG. 23 to FIG. 27) is described later. Here, as described later, when the processing of the memo application is executed, the processing of the other application (task) is paused.

On the other hand, if "NO" in the step S9, that is, if the button image 114 is not touched, it is determined that the memo function is not selected, the other processing is executed in a step S13, and the process returns to the step S1. As the other processing, in a case that the button image 106 or the button image 108 is touched on the main menu screen 100, the icon 120 displayed on the display region 102 is scrolled leftward or rightward. Furthermore, in a case that the button image 112 is touched, a text of an operating guide of the application indicated by the icon 120 designated by the small window 104 is displayed on the stereoscopic LCD 12, for example.

Figure 20:
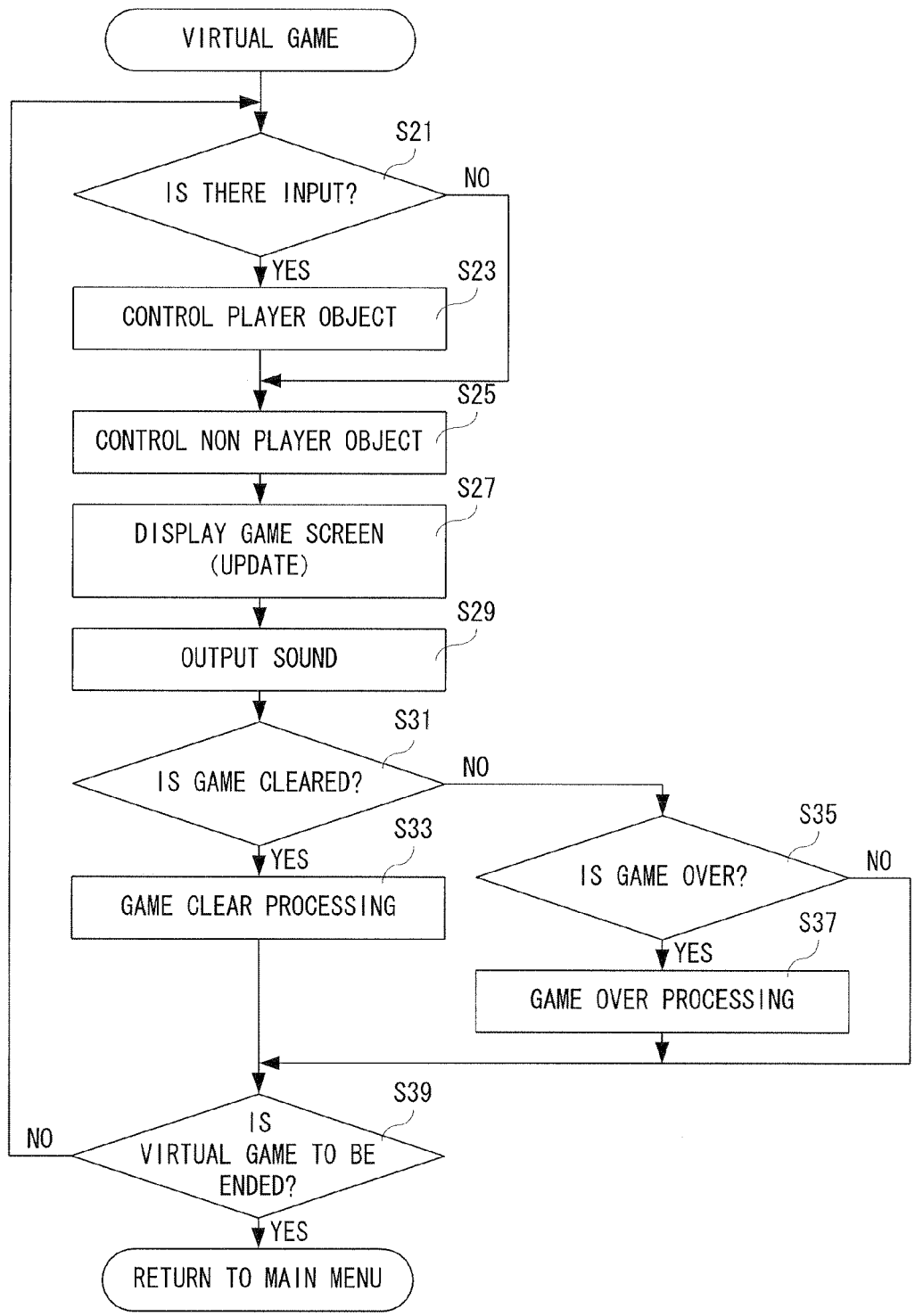
FIG. 20 is a flowchart showing virtual game processing by the CPU shown in FIG. 4.

FIG. 20 is a flowchart showing virtual game processing indicated by the CPU 44*a*. As shown in FIG. 20, when starting the virtual game processing, the CPU 44*a* determines whether or not there is an input in a step S21. That is, the CPU 44*a* determines whether or not the operation data is stored in the operation data buffer 504*a*. If "NO" in the step S21, that is, if there is no input, the process proceeds to a step S25 as it is. On the other hand, if "YES" in the step S21, that is, if there is an input, the player object 202 is controlled in a step S23, and the process proceeds to the step S25. That is, the CPU 44*a* executes an arbitrary action such as moving the player object 202 according to a designation from the player.

In the step S25, a non player object (enemy object 204, etc.) is controlled. Here, the CPU 44*a* executes an arbitrary action such as moving the non player object according to the game program (game application) irrespective of the designation from the player.

In a next step S27, a game screen is displayed (updated). For example, the first game screen 200 as shown in FIG. 12(A) is displayed on the stereoscopic LCD 12. Furthermore, the scan time of the virtual game processing is one frame (screen updating rate (1/60 seconds)), and the first game screen 200 is updated for each frame.

Successively, in a step S29, sound is output. Here, the CPU 44*a* generates sound necessary for the virtual game, such as voices (onomatopoeic sound) of the player object 202 and the enemy object 204, a sound effect, BGM, etc. by using the sound data, and outputs the same from the speakers 22*a*, 22*b*.

Then, in a step S31, it is determined whether or not the game is cleared. That is, the CPU 44*a* determines whether or not the player object 202 reaches the goals of all the courses. If "NO" in the step S31, that is, if the game is not cleared, the process proceeds to a step S35. On the other hand, if "YES" in the step S31, that is, if the game is cleared, game clearing processing is executed in a step S33, and the process proceeds to a step S39. For example, in the step S33, the CPU 44*a* displays a game screen representing that the virtual game is cleared, outputs sound representing it, or executes both of them.

In the step S35, it is determined whether or not the game is over. That is, the CPU 44*a* determines whether or not the remaining number of player objects 202 becomes 0. If "NO" in the step S35, that is, if the game is not over, the process proceeds to the step S39. On the other hand, if "YES" in the step S35, that is, if the game is over, game over processing is executed in a step S37, and the process proceeds to the step S39. For example, in the step S37, the CPU 44*a* displays a game screen representing the game over of the virtual game, outputs sound representing it, or executes both of them.

In the step S39, it is determined whether or not the virtual game is to be ended. Here, the CPU 44*a* determines whether or not the player designates the end of the virtual game. If "NO" in the step S39, that is, if the virtual game is not to be ended, the process returns to the step S21. On the other hand, if "YES" in the step S39, that is, if the virtual game is to be ended, the process returns to the main menu processing shown in FIG. 19. At this time, the main menu processing is executed from the beginning (step S1). This holds true for returning to the main menu processing hereunder.

Figure 21:
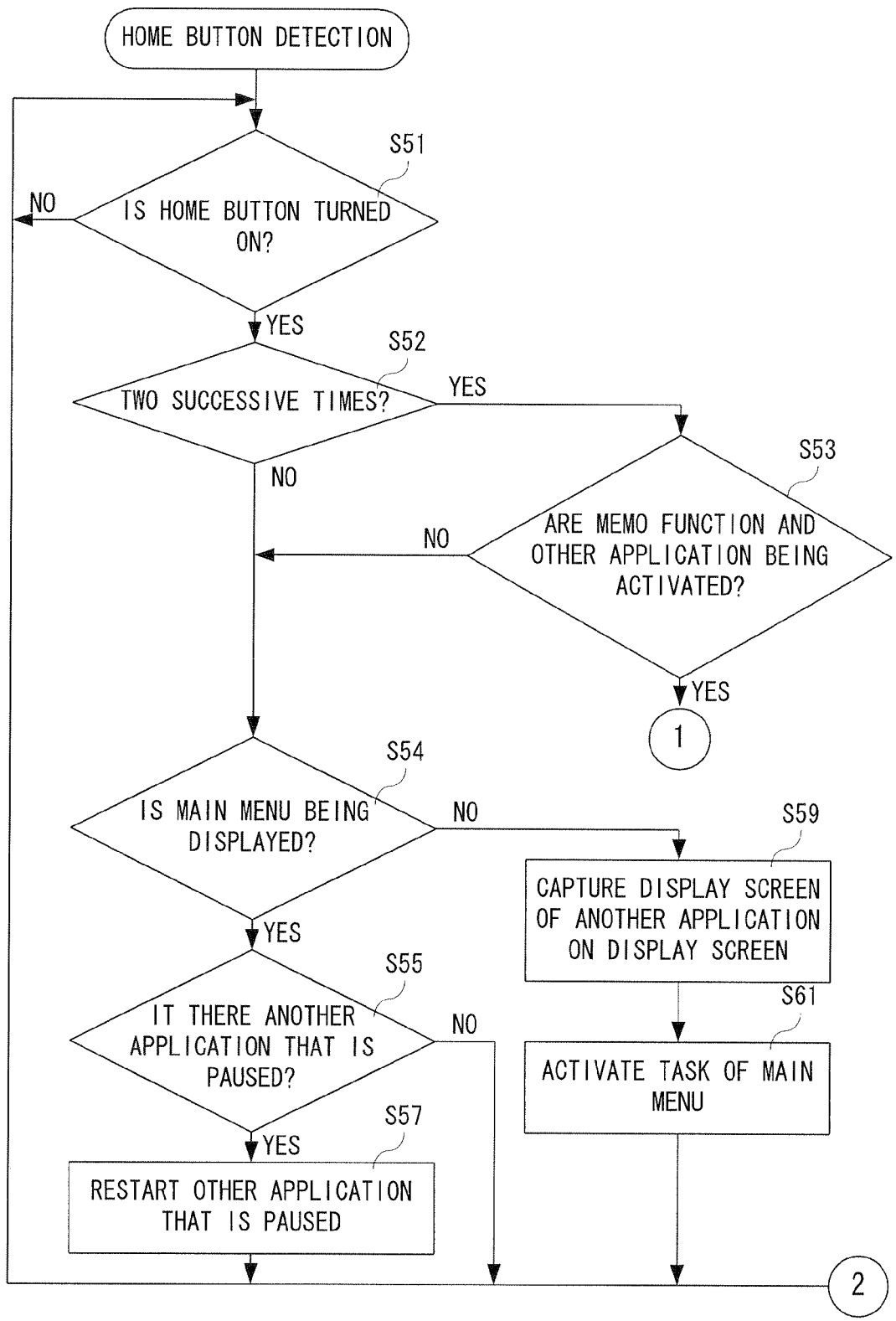
FIG. 21 is a flowchart showing a part of home button detecting processing by the CPU shown in FIG. 4.
Figure 22:
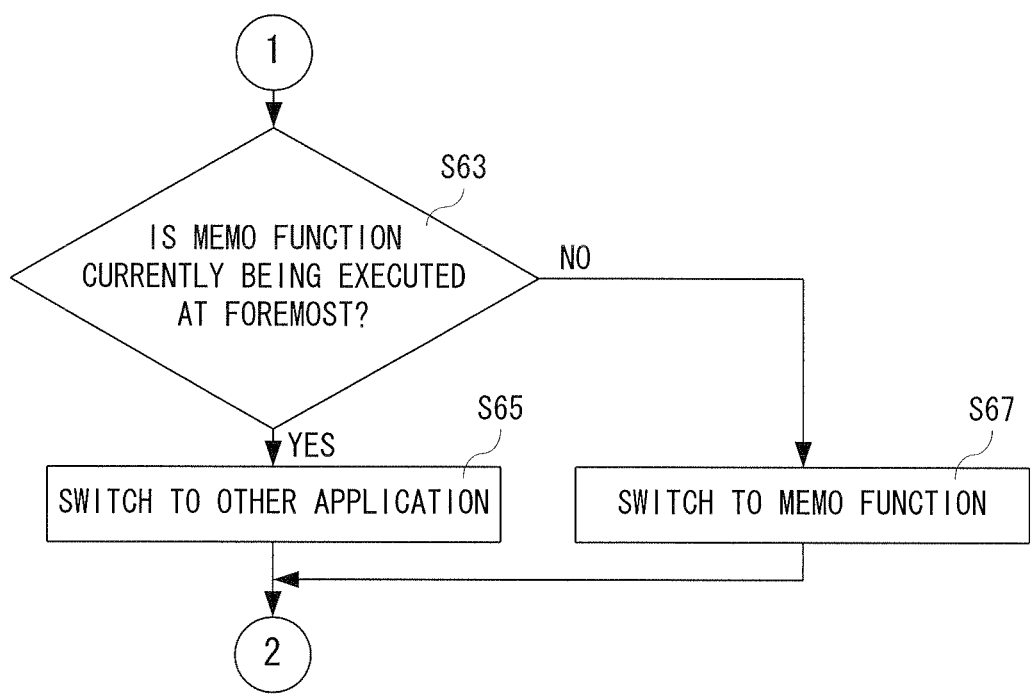
FIG. 22 is a flowchart showing another part of the home button detecting processing by the CPU shown in FIG. 4.

FIG. 21 and FIG. 22 show a flowchart of home button detecting processing by the CPU 44*a* shown in FIG. 4. The home button detecting processing is always executed by the task different from those of the main menu processing and the game processing. As shown in FIG. 21, when starting the home button detecting processing, the CPU 44*a* determines whether or not the home button 24*h* is turned on in a step S51. That is, the CPU 44*a* determines whether or not the operation data as to the home button 24*h* is stored in the operation data buffer 504*a*.

If "NO" in the step S51, that is, if the home button 24*h* is not turned on, the process returns to the step S51. On the other hand, if "YES" in the step S51, that is, if the home button 24*h* is turned on, it is determined whether or not this is performed successive two times in a step S52. That is, the CPU 44*a* determines whether or not the operation data as to the home button 24*h* is detected two times within a predetermined time (several to several tens of frames, for example) with reference to the operation data buffer 504*a*.

If "NO" in the step S52, that is, if this is not performed successive two times, the process proceeds to a step S54. On the other hand, if "YES" in the step S52, that is, if this is performed successive two times, it is determined whether or not both of the memo function and the other application are being activated in a step S53. That is, the CPU 44*a* determines whether or not the display image data of both of the memo function screen (list of memo screen 350 and memo creating screen 400) and the screen of the other application (second game screen 250, for example) are developed in the memory, or it is determined whether or not both of the task of the memo function and the task of the other application are activated.

If "NO" in the step S53, that is, if one or both of the memo function and the other application are not activated, the process proceeds to the step S54. On the other hand, if "YES" in the step S53, that is, if both of the memo function and the other application are being activated, the process proceeds to a step S63 shown in FIG. 22.

In the step S54, it is determined whether or not the main menu is being displayed. That is, the CPU 44*a* determines whether or not the task of the main menu is being activated. If "YES" in the step S54, that is, if the main menu is being displayed, it is determined whether or not there is another application that is suspended (paused) in a step S55. That is, the CPU 44*a* determines whether or not the task of another application is activated, but the task is suspended (paused).

If "NO" in the step S55, that is, if there is no other application that is paused, the process returns to the step S51 as it is. On the other hand, if "YES" in the step S55, that is, if there is another application that is paused, it is determined that restarting the other application is designated, the other application that is paused is restarted in a step S57, and the process returns to the step S51. That is, the CPU 44*a* restarts the task of the other application that is paused.

Furthermore, if "NO" in the step S54, that is, if the main menu is not being displayed, the display screen of another application is captured in a step S59. For example, if the virtual game (game application) is being executed, the game screen is captured. More specifically, the CPU 44*a* reads the display image data corresponding to the screen (upper screen) displayed on the stereoscopic LCD 12 and the screen (lower screen) displayed on the lower LCD 14 from the VRAM, and stores them in the captured image data buffer 504*c* as individual captured image data such that they are identified with each other. For example, the identification information for indentifying the upper screen and lower screen is stored by being brought into correspondence with the captured image data. That is, as described above, the image data of the first captured image 302 and the second captured image 304 are stored in the captured image data buffer 504*c*. Successively, in a step S61, the task of the main menu is activated, and the process returns to the step S51. Accordingly, the main menu processing as described above is started. Although illustration is omitted, in a case that at least any one of the tasks of the memo application program and the application program of the game is executed at this time, the task that is being executed is paused, and the task of the main menu is executed. Accordingly, on the lower LCD 14, the main menu screen 100 as shown in FIG. 11 is displayed. At this time, the screen as to the paused application is displayed at the back of the menu screen 100 or is undisplayed.

As shown in FIG. 22, in the step S63, it is determined whether or not the task of the memo function is currently being executed. If "YES" in the step S63, that is, if the task of the memo function is currently being executed, switching to the other application is made in a step S65, and the process returns to the step S51 shown in FIG. 21. That is, in the step S65, the task of the other application is restarted, and the screen of the other application (second game screen 250, for example) is displayed on the lower LCD 14. At this time, the task of the memo function is paused, so that the screen of the memo function is moved to the back or undisplayed, for example.

On the other hand, if "NO" in the step S63, that is, if the task of the other application is currently being executed, switching to the memo function is made in a step S67, and the process returns to the step S51. That is, in the step S67, the task of the memo function is restarted, and the screen (list of memo screen 350 or memo creating screen 400) of the memo function is displayed on the lower LCD 14. At this time, the task of the other application is paused, so that the screen of the other application is moved to the back or undisplayed, for example.

Figure 23:
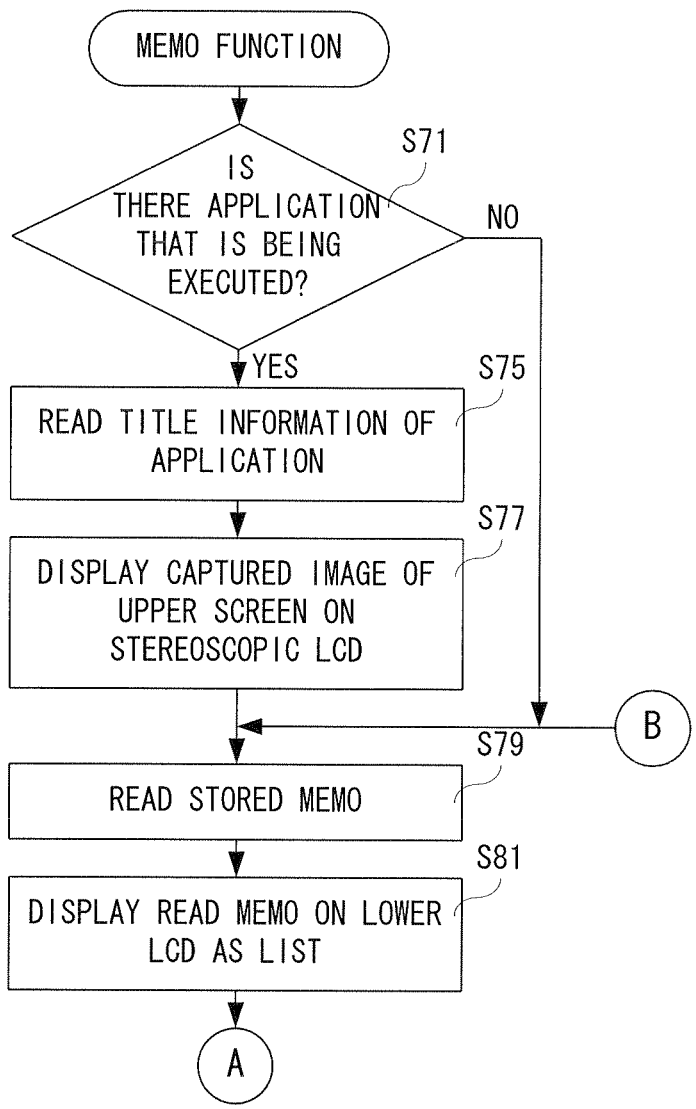
FIG. 23 is a flowchart showing a first part of memo function processing by the CPU shown in FIG. 4.

FIG. 23 to FIG. 27 is a flowchart showing memo function processing by the CPU 44*a* shown in FIG. 4. As shown in FIG. 23, when starting the memo function processing, the CPU 44*a* determines whether or not there is an application that is being executed in a step S71. That is, the CPU 44*a* determines whether or not the task of another application different from the memo function is being activated. If "NO" in the step S71, that is, if there is no application that is being executed, the process proceeds to a step S79 as it is.

On the other hand, if "YES" in the step S71, that is, if there is an application that is being executed, the title information of the application is read in a step S75. That is, the title information data of the application (504*e*, 504*f*, etc., in this embodiment) stored by being brought into correspondence with the application program that is being executed (502g, 502h, etc., in this embodiment) is read from the data memory area 504. Successively, in a step S77, the captured image of the upper screen is displayed on the stereoscopic LCD 12. That is, the CPU 44a outputs the captured image data (the image data of the first captured image 302) as to the upper screen stored in the captured image data buffer 504c to the stereoscopic LCD 12. Thus, the captured screen 300 as shown in FIG. 13(A) is displayed on the stereoscopic LCD 12.

Next, in the step S79, the stored memo is read. That is, the memo data (504g, 504h, etc. in this embodiment) is read from the NAND flash memory 48, and written to the data memory area 504. Then, in a step S81, the read memo is displayed as a list on the lower LCD 14. Here, the CPU 44a displays the list of memo screen 350 as shown in FIG. 13(B) on the lower LCD 14. At this time, the CPU 44a reads the memo image data (thumbnail data, here) from each of the memo data stored in the data memory area 504, and displays a thumbnail corresponding to the thumbnail data read from the display position (display frame 352) indicated by each thumbnail display position data with reference to each of the thumbnail display position data (504b, etc.) Here, in the display frame 352 in which no memo is stored, a blank image is displayed.

Figure 24:
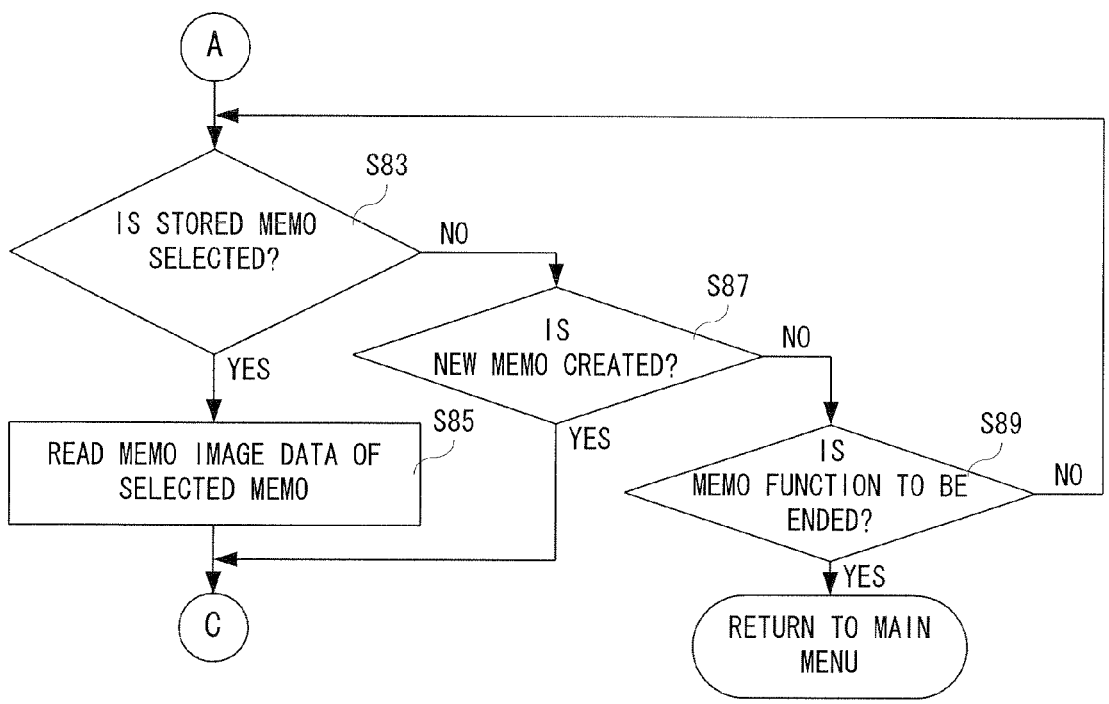
FIG. 24 is a flowchart showing a second part of the memo function processing by the CPU shown in FIG. 4, and being sequel to FIG. 23.

As shown in FIG. 24, in a next step S83, it is determined whether or not the stored memo is selected. That is, the CPU 44a determines whether or not the thumbnail displayed in the display frame 352 is touched on the list of memo screen 350. If "YES" in the step S83, that is, if the thumbnail is touched, it is determined that the stored memo is selected, the memo image data of the selected memo is read in a step S85, and the process proceeds to a step S91 shown in FIG. 25.

On the other hand, if "NO" in the step S83, that is, if the thumbnail is not touched, it is determined that the stored memo is not selected, and it is determined whether or not a new memo is created in a step S87. That is, the CPU 44a determines whether or not the display frame 352 in which the blank image is displayed is touched on the list of memo screen 350. If "YES" in the step S87, that is, if the display frame 352 in which the blank image is displayed is touched, it is determined that a new memo is created, and the process proceeds to the step S91.

Although illustration is omitted, if creating a new memo is designated, the thumbnail display position data as to the position of the display frame 352 in which the blank image touched on the list of memo screen 350 is displayed, that is, the display position of the thumbnail is stored in the buffer area not shown.

On the other hand, if "NO" in the step S87, that is, if the display frame 352 in which the blank image is displayed is not touched, it is determined that a new memo is not created, and it is determined whether or not the memo function is to be ended in a step S89. That is, the CPU 44a determines whether or not the button image 354 is touched on the list of memo screen 350. If "NO" in the step S89, that is, if the button image 354 is not touched, it is determined that the memo function is not be ended, and the process returns to the step S83. On the other hand, if "YES" in the step S89, that is, if the button image 354 is touched, it is determined that the memo function is to be ended, and the process returns to the main menu processing.

Figure 25:
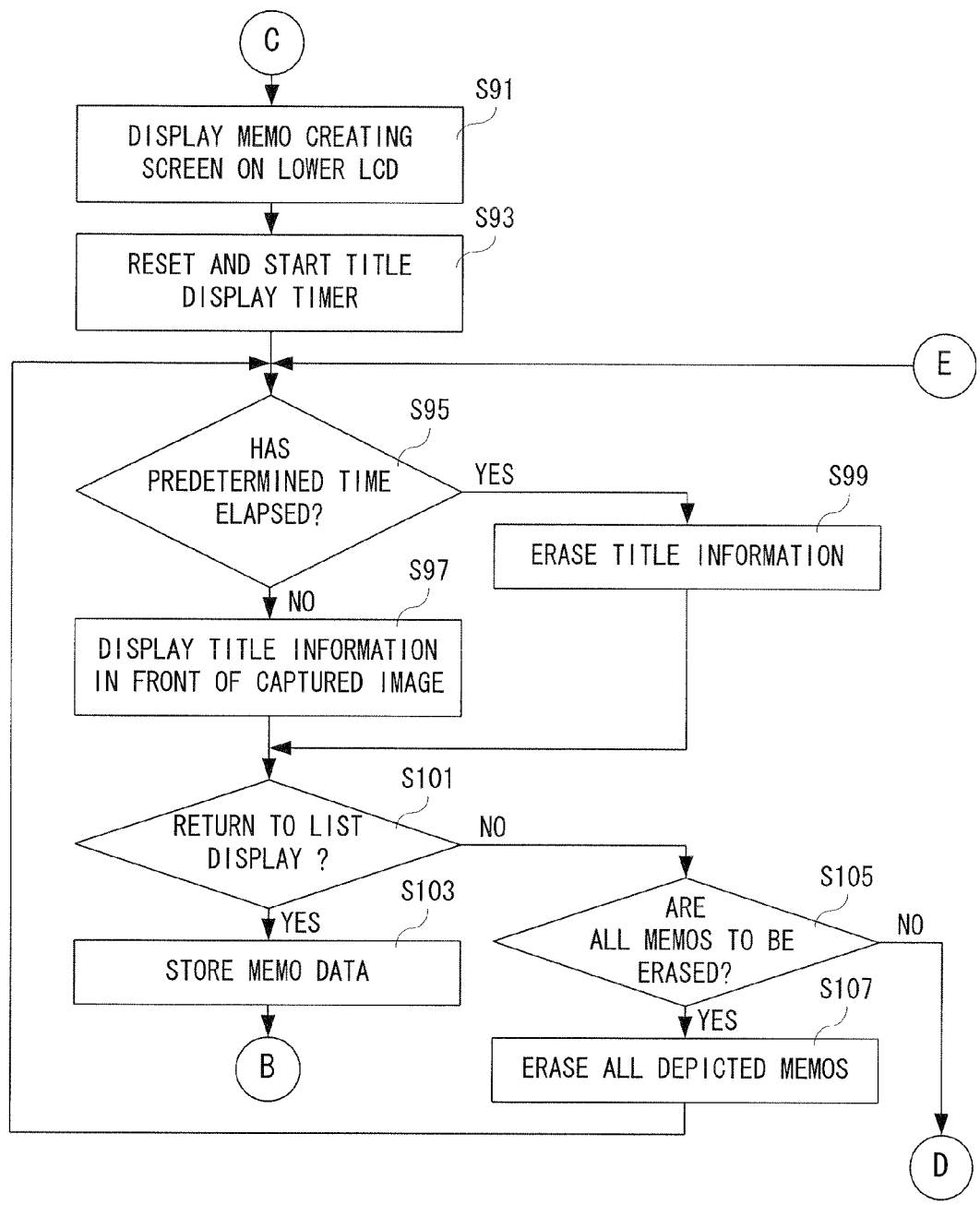
FIG. 25 is a flowchart showing a third part of the memo function processing by the CPU shown in FIG. 4, and being sequel to FIG. 24.

As shown in FIG. 25, in the step S91, the memo creating screen 400 as shown in FIG. 14(B) is displayed on the lower LCD 14. At this time, if the stored memo is selected, the CPU 44a displays the memo image corresponding to the memo image data (original image data, here) read in the step S85 in the display region 402. On the other hand, in a case that the creating a new memo is selected, the CPU 44a displays the blank display region 402.

In a succeeding step S93, the title display timer 504k is reset and started. Then, in a step S95, it is determined whether or not a predetermined time has elapsed. Here, the CPU 44a determines whether or not a count value of the title display timer 504k is above a predetermined time (3 to 5 seconds, for example). If "NO" in the step S95, that is, if the predetermined time has not elapsed, the title information is displayed in front of the captured image in a step S97, and the process proceeds to a step S101.

That is, in the step S97, the CPU 44a displays the title displaying image 310 as shown in FIG. 14(A) in front of the captured image (302, 304, 306). At this time, the CPU 44a reads the title information data (504e, 504f, etc.) as to the paused application to acquire the image data of the specific image 312 and the text image 314, and acquires the image data of the kind image 316 from the image element data 504d. Then, the CPU 44a generates and displays the title displaying image 310. It should be noted that in a case that the title displaying image 310 is first displayed, the display switching data 504i is set to "001", and the partial image 316a of the kind image 316 is emphasized. On the other hand, if "YES" in the step S95, that is, a predetermined time has elapsed, the title information (title displaying image 310) is erased in a step S99, and the process proceeds to the step S101.

In the step S101, it is determined whether to return to the list display or not. That is, the CPU 44a determines whether or not the button image 404 is touched on the memo creating screen 400. If "YES" in the step S101, that is, if the button image 404 is touched, returning to the list display is determined, the memo data is stored in a step S103, and the process returns to the step S79 shown in FIG. 23. That is, in the step S103, the memo image data including the original image data and the thumbnail image data as to the memo, the captured image data, the title information data and the thumbnail display position data are stored in the NAND flash memory 48 as memo data. Furthermore, the reason why the process returns to the step S79 after the memo data is stored is for displaying the memo currently stored on the list of memo screen 350.

Here, in a case that the memo data is stored, the original image data is generated by reading the coordinate data stored in the operation data buffer 504a and the pixel value data stored in the pixel value data buffer 504b, and the thumbnail data is created from the generated original image data. Furthermore, the captured image data is read from the captured image data buffer 504c. In addition, the title information data is read the title information data (504e, 504f, etc.) corresponding to the application paused when the memo is created. Then, the thumbnail display position data is read the thumbnail display position data stored in the buffer area in advance when creating a new memo is designated.

Although an explanation in detail is omitted, in a case that the stored memo is edited, the memo image data is updated. That is, the memo data is overwritten. In this case, the captured image data may be overwritten (updated) with the currently captured image data.

Furthermore, if "NO" in the step S101, that is, if the button image 404 is not touched, not returning to the list display is determined, and it is determined whether or not all the memos are to be erased in a step S105. Here, the CPU

44*a* determines whether or not the operating region 4182 of the button image 418 is touched on the memo creating screen 400 as shown in FIG. 16(B). If "NO" in the step S105, that is, if the operating region 4182 is not touched, it is determined that all of the memos are not to be erased, and the process proceeds to a step S109 shown in FIG. 26. On the other hand, if "YES" in the step S105, that is, if the operating region 4182 is touched, it is determined that all the memos are to be erased, all the created memos are erased in a step S107, and the process returns to the step S95. That is, in the step S107, the CPU 44*a* totally erases the operation data (coordinate data) stored in the operation data buffer 504*a* and the pixel value data stored in the pixel value data buffer 504*b*. Accordingly, the display region 402 of the memo creating screen 400 is made blank.

Figure 26:
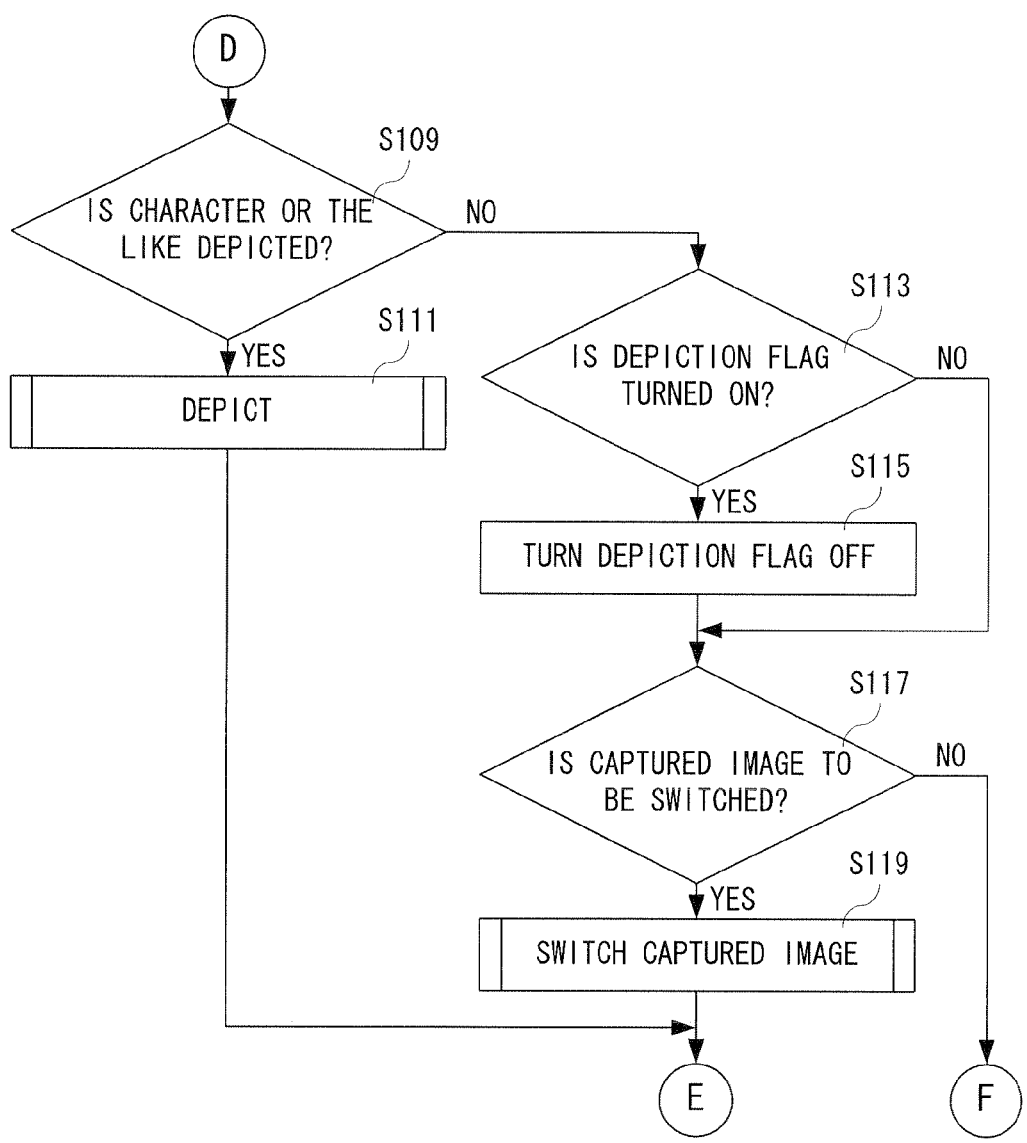
FIG. 26 is a flowchart showing a fourth part of the memo function processing by the CPU shown in FIG. 4, and being sequel to FIG. 25.

As shown in FIG. 26, it is determined whether or not a character or the like is depicted in the step S109. As described above, the CPU 44*a* determines whether or not the operated position in the current frame indicated by the coordinate data from the touch panel 16 is within the display region 402 in a state that the pen tool is selected in response to a touch of the button image 406, 408, 410. Here, as described above, the CPU 44*a* determines that the character or the like is not depicted in a case that no coordinate data is input from the touch panel 16, in a case that the eraser tool is selected in response to a touch of the button image 412, and in a case that the operated position indicated by the coordinate data is in the display region (operating region) of the button images 404-418.

If "YES" in the step S109, that is, if the character or the like is depicted, depicting processing (see FIG. 28) described later is executed in a step S111, and the process returns to the step S95 shown in FIG. 25. On the other hand, if "NO" in the step S109, that is, if the character or the like is not depicted, it is determined whether or not the depiction flag 504*j* is turned on in a step S113. If "NO" in the step S113, that is, if the depiction flag 504*j* is turned off, the process proceeds to a step S117 as it is. On the other hand, if "YES" in the step S113, that is, if the depiction flag 504*j* is turned on, the depiction flag 504*j* is turned off in a step S115, and the process proceeds to the step S117.

In the step S117, it is determined whether or not the captured image is to be switched. That is, the CPU 44*a* determines whether or not the button image 414 is touched on the memo creating screen 400. If "NO" in the step S117, that is, if the button image 414 is not touched, switching of the captured image is not determined, and the process proceeds to a step S121 shown in FIG. 27 as it is. On the other hand, if "YES" in the step S117, that is, if the button image 414 is touched, it is determined that switching of the captured image is determined, and in a step S119, captured image switching processing (see FIG. 29) described later is executed, and the process returns to the step S95.

Figure 27:
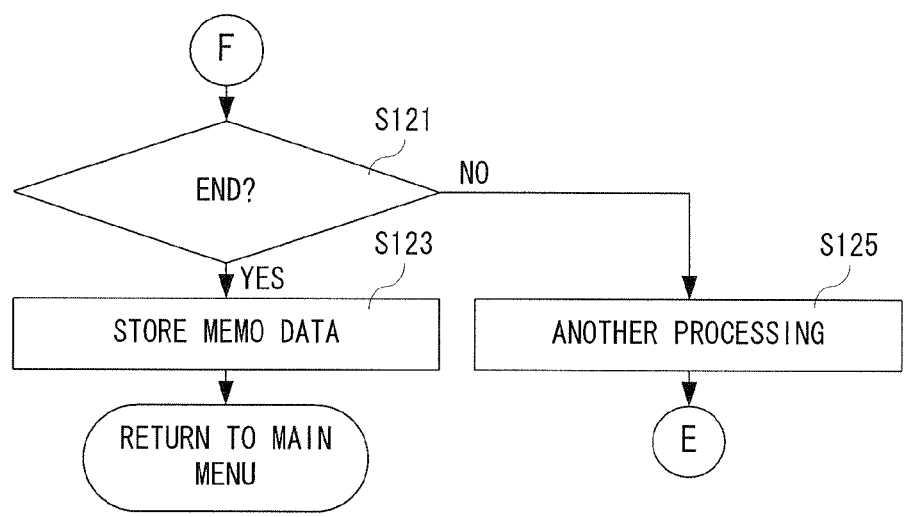
FIG. 27 is a flowchart showing a fifth part of the memo function processing by the CPU shown in FIG. 4, and being sequel to FIG. 26.

As shown in FIG. 27, in the step S121, it is determined whether to end or not. That is, it is determined whether or not the operating region 4180 of the button image 418 is touched on the memo creating screen 400. If "YES" in the step S121, that is, if the operating region 4180 is touched, that it is to be ended is determined, the memo data is stored as described above in a step S123, and the process returns to the main menu processing. On the other hand, if "NO" in the step S121, that is, if the operating region 4180 is not touched, that it is not to be ended is determined, the other processing is executed in a step S125, and the process returns to the step S95.

Here, in the step S125, the CPU 44*a* executes selection and change of kind of the pen tool or selection of the eraser tool in response to a touch of the button images 406-412, erases the memo according to a touch operation on the display region 402 in a case that the eraser tool is selected, and switches between display and undisplay of the button image 418 in response to a touch of the button image 416.

Figure 28:
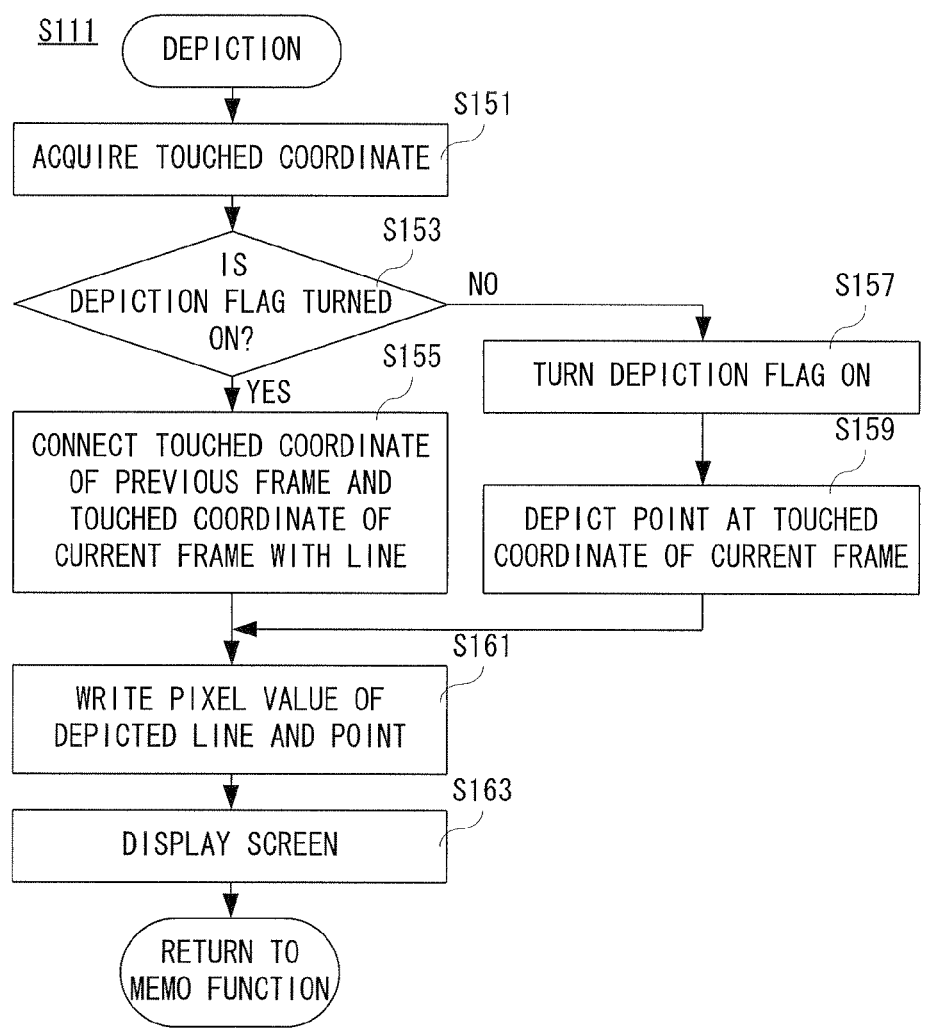
FIG. 28 is a flowchart showing depicting processing by the CPU shown in FIG. 4.

FIG. 28 is a flowchart showing depicting processing in the step S111 shown in FIG. 26. As shown in FIG. 28, when starting the depicting processing, the CPU 44*a* acquires touched coordinate in a step S151. That is, the CPU 44*a* acquires the operation data (coordinate data) of the current frame stored in the operation data buffer 504*a*. In a next step S153, it is determined whether or not the depiction flag 504*j* is turned on.

If "YES" in the step S153, that is, if the depiction flag 504*j* is turned on, the coordinate of the previous frame and the coordinate of the current frame are connected by a line in a step S155, and the process proceeds to a step S161. That is, in the step S155, the line in color indicated by the pen tool that is being selected is depicted such that the coordinate of the previous frame and the coordinate of the current frame are connected on the VRAM.

On the other hand, if "NO" in the step S153, that is, if the depiction flag 504*j* is turned off, in a step S157, depiction flag 504*j* is turned on, a point is depicted in the coordinate of the current frame in a step S159, and the process proceeds to the step S161. That is, in the step S159, the point in color indicated by the pen tool that is being selected is depicted in the coordinate of the current frame on the VRAM.

In the step S161, a pixel value as to the line or the point that is currently depicted is written. That is, the CPU 44*a* writes the pixel value data as to each of the points making up of the line currently depicted and a depicted point in the pixel value data buffer 504*b*. Then, in a step S163, the screen is displayed, and the process returns to the memo function processing. Thus, as shown in FIG. 15(A) and FIG. 16(B), the memo creating screen 400 in which points and lines are depicted is displayed.

Figure 29:
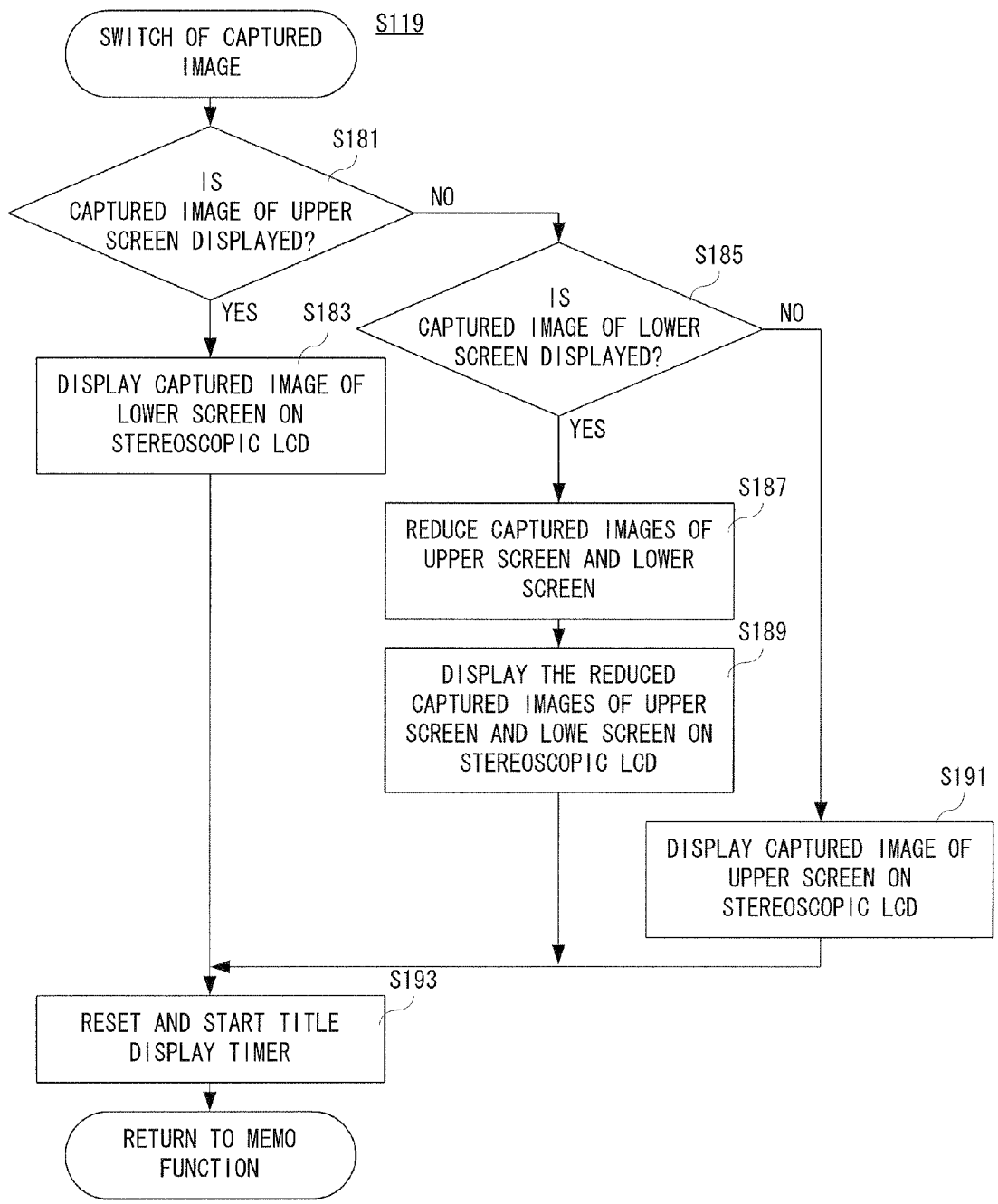
FIG. 29 is a flowchart showing captured image switching processing by the CPU shown in FIG. 4.

FIG. 29 is a flowchart showing captured image switching processing in the step S119 shown in FIG. 26. As shown in FIG. 29, when starting the captured image switching processing, the CPU 44*a* determines whether or not the captured image of the upper screen (first captured image 302) is displayed in a step S181. That is, it is determined whether or not "001" is set as display switching data 504*i*.

If "YES" in the step S181, that is, if the captured image of the upper screen is displayed, the captured image of the lower screen (second captured image 304) is displayed on the stereoscopic LCD 12 in a step S183, and the process proceeds to a step S193. Although illustration is omitted, when the processing in the step S183 is executed, the display switching data 504*i* is updated to "010". On the other hand, if "NO" in the step S181, that is, if the captured image of the upper screen is not displayed, it is determined whether or not the captured image of the lower screen is displayed in a step S185. That is, it is determined whether or not "010" is set as display switching data 504*i*.

If "YES" in the step S185, that is, if the captured image of the lower screen is displayed, the captured images of the upper screen and the lower screen are reduced in a step S187, the reduced captured images of the upper screen and the lower screen (third captured image 306) are displayed on the stereoscopic LCD 12 in a step S189, and the process proceeds to the step S193. Although illustration is omitted, when the processing in the steps S187 and S189 is executed, the display switching data 504*i* is updated to "100".

Alternatively, if "NO" in the step S185, that is, if the reduced captured images of the upper screen and the lower screen are displayed, the captured image of the upper screen is displayed on the stereoscopic LCD 12 in a step S191, and the process proceeds to a step S193. Although illustration is omitted, when the processing in the step S191 is executed, the display switching data 504*i* is updated to "001".

In the step S193, the title display timer 504*k* is reset and started, and the process returns to the memo function processing. Accordingly, every time that the display of the captured image is switched, the title displaying image 310 is displayed on the stereoscopic LCD 12.

According to this embodiment, when the memo application is executed during execution of another application different from the memo application, a screen representing the result of the execution of the other application is captured, and the captured image is displayed on the screen different from the screen on which a memo is created, and therefore, the player can make a memo, viewing an important matter about which a memo is to be made and matters relative to the memo.

Here, in this embodiment, in a case that the memo application is executed during execution of another application, and when the stored memo is selected as well, the captured image as to the other application is displayed on the stereoscopic LCD, but there is no need of being restricted thereto. In such a case, the stored captured image may be displayed on the stereoscopic LCD together with the stored memo. Furthermore, the captured image of the other application that is being paused (currently captured image) and the stored captured image may be switchable.

Furthermore, in this embodiment, the captured image is stored together with the memo, but the captured image may not be stored.

The game apparatus 10 of another embodiment is the same as the above-described embodiment except for that in a case that the captured image is stored, an icon of the memo application is pasted, and the currently captured image and the stored captured image can be selectively displayed and switched, and therefore, a redundant explanation is omitted.

As shown in FIG. 30(A), when the button image 416 is touched on the memo creating screen 400 of another embodiment, the button image 418 is displayed similar to the above-described embodiment, but the button image 418 of the other embodiment is further provided with an operating region 4184. When the operating region 4184 is touched, storing the captured image data is designated, and a reduced image (icon) 440 as to the application that is paused is displayed (pasted) in a predetermined position (initial position) as shown in FIG. 30(B).

Although an explanation in detail is omitted, in another embodiment, the image data of the icon 440 is included in the application title information data (504*e*, 504*f*, . . . ) of the corresponding application. Here, the image data of the icon 440 may be stored in the memory of the main boy of the game apparatus (NAND flash memory 48) in advance.

For example, the pasting position (display position) of the icon 440 is changeable. Furthermore, the icon 440 pasted once can be erased.

More specifically, when the icon 440 is long-pushed on the memo creating screen 400 shown in FIG. 30(B), four button images 420, 422, 424, 426 are displayed so as to enclose the icon 440 on the display region 402 of the memo creating screen 400 as shown in FIG. 31(A). That is, a transition to a mode of changing the display position of the icon 440 is made. Here, when the icon 440 is continuously (120-180 frames, for example,) touched, that the icon 440 is long-pushed is determined.

When the icon 440 is dragged in a state that the button images 420-426 are displayed, the icon 440 can be moved in a desired position. Here, by clicking any one of the button images 420-426, the icon 440 may be moved by a predetermined distance (predetermined number of dots) in the direction of the arrow indicated by each image. Here, the icon 440 is never out of the display region 402.

Furthermore, when the icon 440 is clicked on the memo creating screen 400 in FIG. 30(B), although illustration is omitted, the captured image data as to the captured image that is stored together with the memo that is being edited is read from the memo data (504*g*, 504*h*, etc.). Then, the stored captured image (first captured image 302) is displayed on the stereoscopic LCD 12. That is, the currently captured image is switched to the stored captured image. Furthermore, as shown in FIG. 31(B), the button image 430 is displayed within the display region 402 in the vicinity of the icon 440 at this time. The button image 430 includes two operating regions 4300, 4302.

Here, clicking means that touch-off is performed relatively shortly after (several frames after) touch-on is performed without the touched position being changed.

When the operating region 4300 is touched, the stored captured image is switched. That is, it is possible to switch among the stored first captured image, the stored second captured image, and the third captured image including the stored first captured image and second captured image that are in a reduced-size (hereinafter referred to as "stored third captured image") and display them on the stereoscopic LCD 12 one another. Here, in a case that the captured image data is not stored or in a case that a new memo is created, the stored captured image cannot be switched, and therefore, in such a case, even if the operating region 4300 is touched, no switch is performed. For example, in a case that the captured image data is not stored, or in a case that a new memo is created, the operating region 4300 is reversed in color, or grayed out.

Here, the stored captured image switching processing is the same as the captured image switching processing (FIG. 29) of the above-described embodiment, and therefore, a redundant explanation is omitted.

Additionally, when the operating region 4302 is touched, the icon 440 is erased. That is, in creating a new memo, not storing the captured image data is selected, or in editing the memo, erasing the captured image data is selected. Here, even if the icon 440 is erased, the currently captured image data is never erased from the captured image data buffer 504*c*. This is because that even after the icon 440 is erased, the currently captured image is required to be displayed in the processing thereafter, and storing the captured image data (pasting the icon 440) may sometimes be designated.

Furthermore, even if displaying and switching the stored captured image is selected once, when the button image 414 is touched, a switch to the displaying and switching the currently captured image can be performed. At this time, the captured image data stored in the captured image data buffer 504*c* is read. Although illustration is omitted, when the button image 414 is touched, the button image 430 is erased (undisplayed). Then, every time that the button image 414 is touched, the current first captured image, the current second captured image, and a third captured image (hereinafter referred to as "current third captured image") including the current first captured image and the current second captured image that are in a reduced-size are switched as shown in the aforementioned embodiment.

Figure 32:
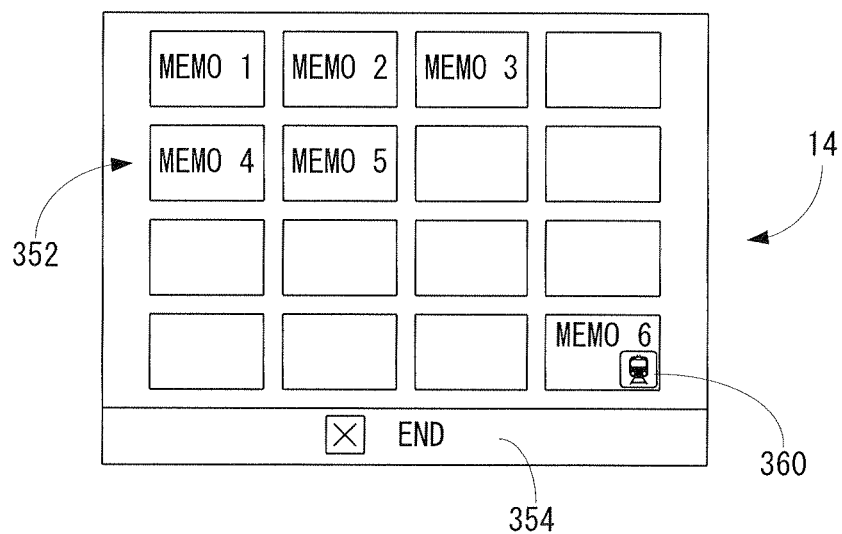
FIG. 32 is an illustrative view showing an example of a list of memo screen of another embodiment to be displayed on the lower LCD shown in FIG. 1.

Furthermore, as shown in FIG. 32, in another embodiment, in a case that the captured image is stored with the memo, an image (icon reduced image) 360 representing that the captured image is stored is displayed in the list of memo screen 350. The icon reduced image 360 is a reduced image of the above-described icon 440. The reducing method is a method the same as the reducing method of the captured image in the above-described embodiment, and a redundant explanation is omitted. For example, as shown in FIG. 32, the icon reduced image 360 is displayed in front of the thumbnails of the memo images (memo 6, here) in a predetermined position (lower right) of the display frame 352.

Accordingly, in another embodiment, in a case that the captured image is stored with the memo, the image data of the icon 440, the display position data of the icon 440 (icon display position data) on the memo creating screen 400 and the display position data of the reduced image (icon reduced image 360) of the icon 440 on the list of memo screen 350 (reduced image display position data) are added to the memo data. Here, in a case that the image data of the icon 440 is stored in advance in the main body memory (NAND flash memory 48) of the game apparatus 10, identification information of the image data of the icon 440 may be stored.

More specifically, in the other embodiment, to the depicting processing in the embodiment as described before, processing of pasting and erasing the icon 440 (storing and erasing the captured image), moving processing of the icon 440, and display switching processing between the currently captured image and the stored captured image are added. More specifically, the processing shown in FIG. 33 and FIG. 34 is provided between the steps S117 and S121 of the depicting processing shown in FIG. 23 to FIG. 27.

Figure 33:
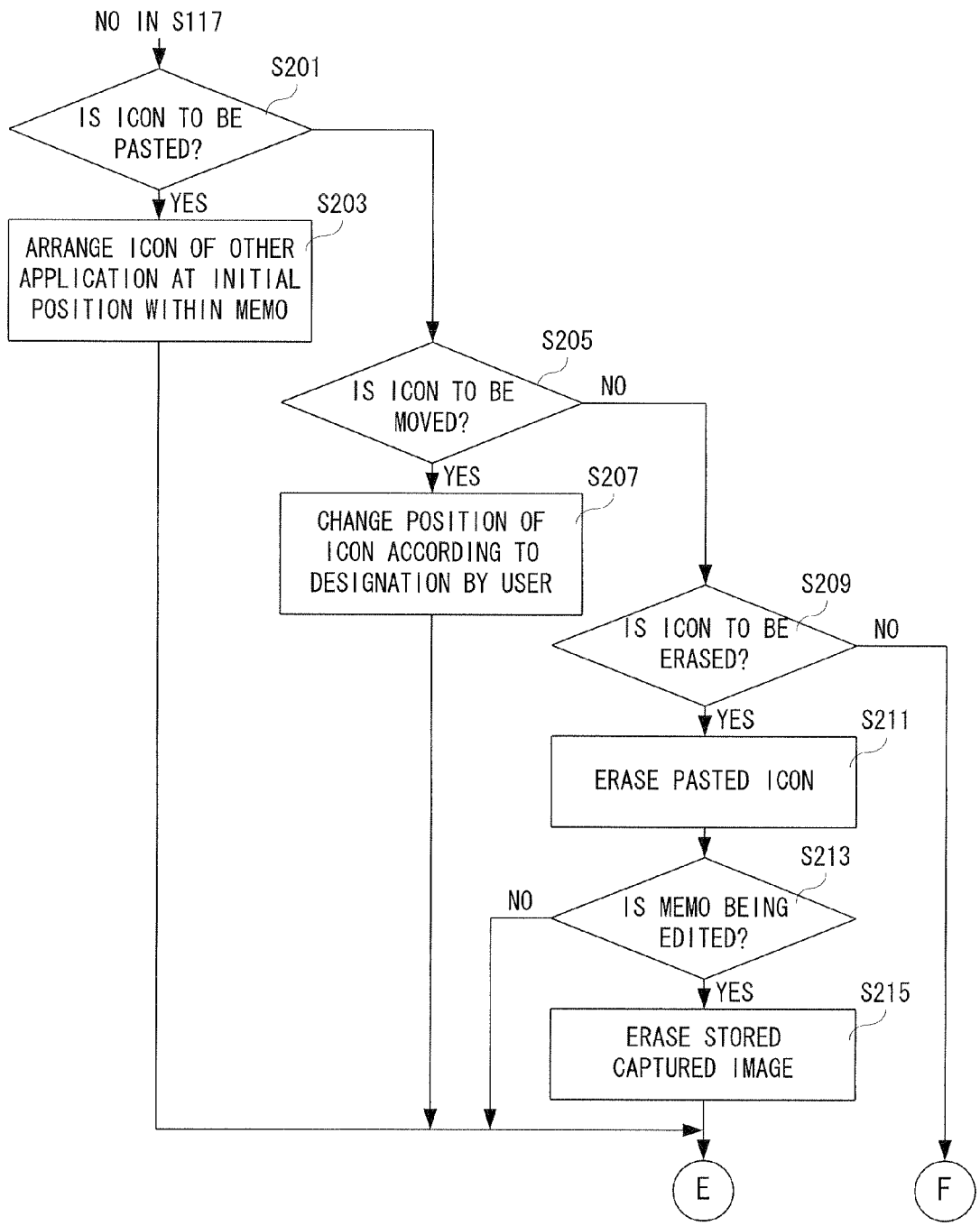
FIG. 33 is a flowchart showing a part of memo function processing of another embodiment by the CPU shown in FIG. 4.
Figure 34:
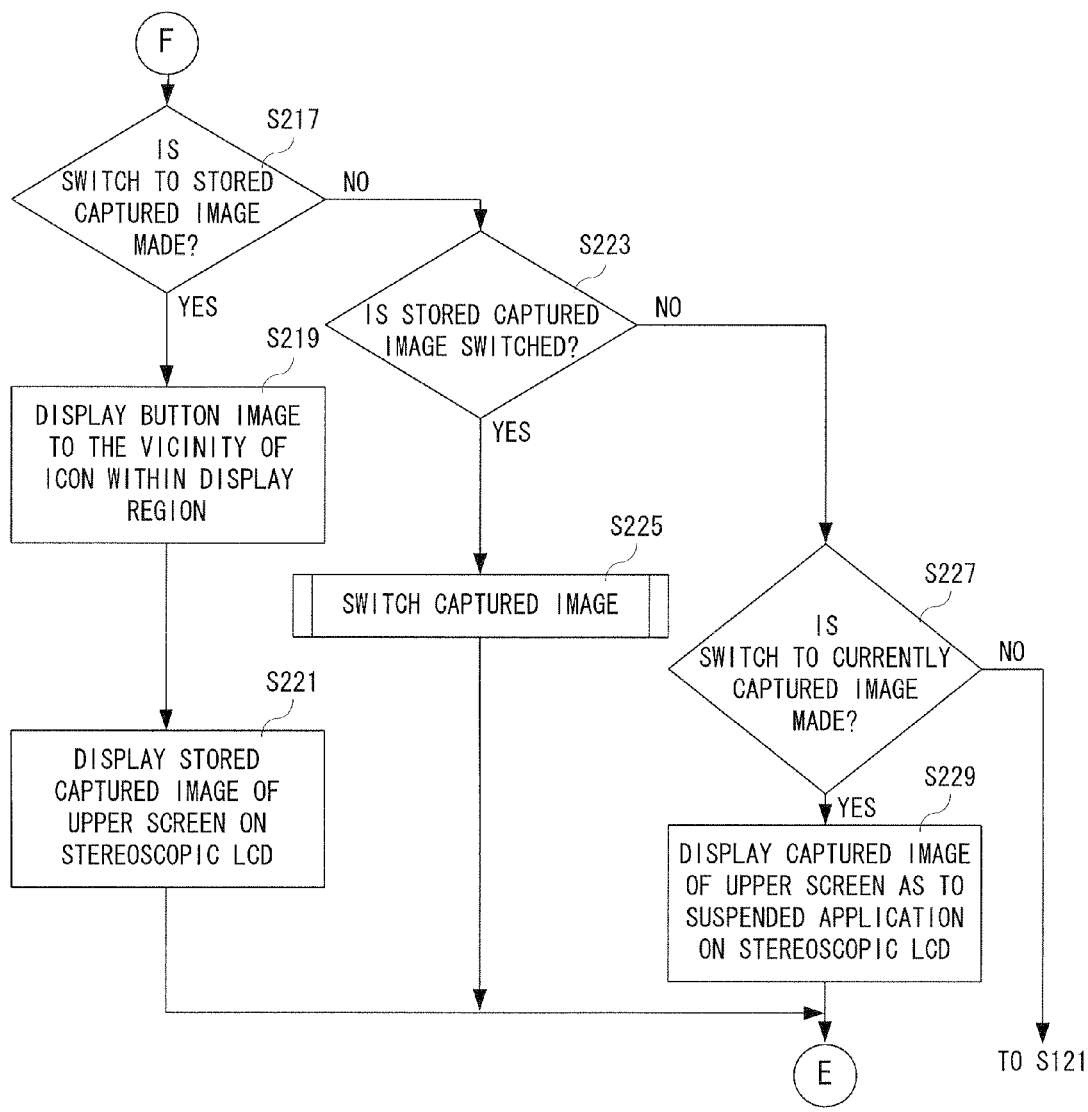
FIG. 34 is a flowchart showing another part of the memo function processing of another embodiment by the CPU shown in FIG. 4, and being sequel to FIG. 33.

As shown in FIG. 33, if "NO" is determined in the step S117, it is determined that the icon 440 is to be pasted in a step S201. In other words, the CPU 44a determines whether or not the captured image is to be stored (changed). More specifically, the CPU 44a determines whether or not the operating region 4184 of the button image 418 is touched on the memo creating screen 400. If "YES" in the step S201, that is, if the operating region 4184 is touched, it is determined that the icon 440 is to be pasted, the icon 440 of the paused other application is arranged at an initial position within the memo in a step S203, and the process returns to the step S95 shown in FIG. 25.

On the other hand, if "NO" in the step S201, that is, if the operating region 4184 is not touched, it is determined that the icon 440 is not to be pasted, and it is determined whether or not the icon 440 is to be moved in a step S205. That is, the CPU 44a determines whether or not the touched coordinates are changed after moving the icon 440 is selected. When it is detected that the icon 440 is long-pushed, in the other processing (S125), moving the icon 440 is selected, and the button images 420-426 are displayed around the icon 440 within the display region 402 as described above.

Although an illustration is omitted, whether or not the icon 440 is long-pushed is always detected in another task by the CPU 44a. In a case that a touch operation continues for over a predetermined time (120 to 180 frames in this embodiment) without the change of the touched position, it is detected that the icon 440 is long-pushed, and in a case that the touched position is on the icon 440, it is determined that the icon 440 is long-pushed.

If "YES" in the step S205, that is, if the icon 440 is to be moved, the position of the icon 440 is changed according to a designation by the user in a step S207, and the process returns to the step S95. Although detailed explanation is omitted, in the step S207, according to a dragging operation by the user, that is, according to a change of the touched position, the display position of the icon 440 is changed.

Although an explanation in detail is omitted, when the movement of the icon 440 is ended, that is, when touch off is performed after the dragging operation, the coordinate data as to the dragging operation is immediately erased from the operation data buffer 504a. This is because it is not included in the memo image data.

On the other hand, if "NO" in the step S205, that is, if the icon 440 is not clicked, it is determined that the icon 440 is not moved, and it is determined whether or not the icon 440 is to be erased in a step S209. That is, it is determined whether or not the operating region 4302 of the displayed button image 430 in a step S219 described later is touched. If "YES" in the step S209, that is, if the operating region 4302 is touched, it is determined that the icon 440 is erased, the pasted icon 440 is erased in a step S211, and it is determined whether or not the memo is being edited in a step S213. That is, it is determined whether or not the stored memo data is read.

If "NO" in the step S213, that is, if the memo is not being edited, the process returns to the step S95 as it is. On the other hand, if "YES" in the step S213, that is, if the memo is being edited, the captured image data is erased from the memo data that is being edited in a step S215, and the process returns to the step S95. Accordingly, in such a case, when storing the captured image data is designated thereafter, the currently captured image data is stored to update the captured image data.

Furthermore, if "NO" in the step S209, that is, if the operating region 4302 is not touched, it is determined whether to switch to the stored captured image or not in a step S217 shown in FIG. 34. That is, the CPU 44a determines whether or not the icon 440 is clicked.

Although illustration is omitted, whether to be clicked or not is always detected in another task by the CPU 44a. Although an explanation in detail is omitted, in a case that a time from touch-on to touch off is within a predetermined time (several frames), and the touched position of the touch-on and the touched position of the touch-off are on the same or approximately the same (several dots), clicking is determined, and when the touched position is on the icon 440, that the icon 440 is clicked is determined.

If "YES" in the step S217, that is, if the icon 440 is clicked, a switch to the stored captured image is determined, and in a step S219, the button image 430 is displayed to the vicinity of the icon 440 within the display region 402. In a next step S221, the captured image of the upper screen (first captured image 302) out of the captured images stored together with the memo that is being edited is displayed on the stereoscopic LCD 12, and the process returns to the step S95.

Here, when the processing in the step S221 is executed, the display switching data 504i is set to "001".

Furthermore, if "NO" in the step S217, that is, if the icon 440 is not clicked, it is determined whether or not the stored captured image is to be switched in a step S223. That is, the CPU 44a determines whether or not the operating region 4300 of the button image 430 is touched. If "YES" in the step S223, that is, if the operating region 4300 is touched, it is determined that the stored captured image is to be switched, captured image switching processing is executed on the stored captured image in a step S225, and the process returns to the step S95.

Here, the captured image switching processing in the step S225 is the same as the processing shown in FIG. 29 except for that the used captured image data is different, and therefore, a redundant explanation is omitted. Here, they are different in that the switching processing as described before is for switching among the current first to third captured images, but the switching processing performed in the step S225 is for switching among the stored first to third captured images.

Furthermore, if "NO" in the step S223, that is, if the operating region 4300 is not touched, it is determined whether to switch to the currently captured image or not in a step S227. That is, the CPU 44a determines whether or not the button image 414 is touched while the stored captured image is displayed. If "YES" in the step S227, that is, if the button image 414 is touched, a switch to the currently captured image is determined, in a step S229, the captured image of the upper screen as to the suspended (paused) application (current first captured image 302) is displayed on the stereoscopic LCD 12, and the process returns to the step S95. Here, when the processing in the step S229 is executed, the display switching data 504i is set to "001". On the other hand, if "NO" in the step S227, that is, if the button image 414 is not touched, it is determined not to be a switch to the currently captured image, and the process proceeds to the step S121 shown in FIG. 27.

Here, in the depicting processing of the other embodiment, in the other processing in the step S127, when it is determined that the icon 440 is long-pushed, a transition to a mode of moving the icon 440 is made, and processing of displaying the button images 420-426 around the icon 440 is also executed as described above.

Furthermore, in the other embodiment, in a case that the memo in which the captured image is stored is edited, any one of the currently captured image and the stored captured image is selectively displayed, and therefore, it is possible to share the display switching data 504i.

In addition, in the other embodiment, in a case that the captured image is not stored, that is, in a case that the icon 440 is not pasted or in a case that the icon 440 is erased, when the processing in the step S103 and the step S123 is executed, the memo data not including the captured image data is stored in the NAND flash memory 48.

Additionally, in the other embodiment, in a case that on the list of memo screen 350, a thumbnail on which the icon reduced image 360 is displayed is touched to designate editing the memo on which the captured image is stored, the icon 440 is displayed together with the memo image at the position according to the icon display position data included in the memo data in the display region 402 of the memo creating screen 400 displayed on the lower LCD 14.

According to the other embodiment, in addition to the advantage of the above-described embodiment, whether the captured image is to be stored can be selected, and in a case that the captured image is stored, the icon of the application can be pasted on the memo. Accordingly, it is possible to know an application corresponding to the memo in the list of the memo and easily search the desired memo.

Here, in the other embodiment, the reduced image of the application-specific image (icon) is pasted on the memo, but a reduced image (thumbnail) of a captured image as to the application may be pasted on the memo. In a case that the thumbnail of the captured image is pasted, the first captured image, the second captured image or the third captured image may be made selectable.

Furthermore, in each of the above-described embodiments, when the home button is turned on during execution of an application program, the application program is paused, but the background processing may be continued as to the application that cannot be paused, such as a case that communications cannot be paused during execution of the communication game.

In addition, in each of the above-described embodiments, when creating a memo is started or when the captured image is switched, the title information is displayed in front of the captured image (stereoscopic LCD) only for the predetermined time, but the title information may be displayed in front of the memo creating screen (lower LCD) only for the predetermined time, or the title information may not be displayed.

Alternatively, during creation of the memo, the title information may continue to be displayed. In such a case, in a case that the title information is displayed on the stereoscopic LCD as the above-described embodiment, the title information may translucently be displayed in front of the captured image, or the captured image may be displayed in an area other than the title information. Or, the title information may continue to be displayed on the lower LCD. If so, the memo can be created with reference to the whole of the captured image.

In addition, in each of the above-described embodiments, at a time of creating a memo, the captured screens as to the first captured image, the second captured image or the third captured image are displayed on the stereoscopic LCD, but the captured screen as to the first captured image or the second captured image may be displayed on the stereoscopic LCD. That is, the third captured image may not be displayed.

Furthermore, in each of the above-described embodiments, the touch panel is provided on the lower LCD, and therefore, the captured screen is displayed on the stereoscopic LCD, and the memo creating screen is displayed on the lower LCD. However, in a case that the touch panel is provided on the stereoscopic LCD, the memo creating screen may be displayed on the stereoscopic LCD, and the captured screen may be displayed on the lower LCD.

In addition, in each of the above-described embodiments, the captured screens as to the first captured image, the second captured image and the third captured image are switchably displayed, but the captured screen as to any one of the captured images may fixedly be displayed.

Additionally, in each of the above-described embodiments, two LCDs are provided to the game apparatus, and therefore, the captured screen is displayed on the stereoscopic LCD, and the memo creating screen is displayed on the lower LCD. However, one LCD is divided into two areas, the captured screen may be displayed on one area, and the memo creating screen may be displayed on the other area. That is, the captured screen and the memo creating screen are only necessary to be displayed in separate areas.

Furthermore, in each of the above-described embodiments, in a case that both of the first captured image and the second captured image are displayed on the captured screen, the captured screen as to the third captured image in which both of the first captured image and the second captured image are vertically arranged in a reduced-size is displayed, but the first captured image and the second captured image can be displayed by scrolling the captured screen without reducing them. Additionally, the third captured image is an image in which the first captured image and the second captured image are horizontally arranged. In this case, each of the first captured image and the second captured image may be reduced such that the lateral length is halved, for example.

In addition, in the above-described embodiment, a handwritten memo by using the pen tool is created, but there is no need of being restricted thereto. For example, a software keyboard is displayed at a part of the memo creating screen, and by a key operation, a character, or the like may be input. Alternatively, both of the handwriting and the key operation by the software keyboard can be used.

In addition, in the above-described embodiment, an explanation is made on the game apparatus, but the present invention can be applied to an information processing apparatus with a display (portable information terminal, such as PC, PDA, etc., cellular phone, TV, electronic photo frame, sound/video player, various information appliance, etc. other than the game apparatus). Furthermore, the display is not for performing an autostereoscopic display.

Furthermore, in the above-described embodiment, the display (stereoscopic LCD 12, lower LCD 14) is integrally provided with the game apparatus, but it may be provided separately from the game apparatus. The input device (touch panel 16, buttons 24*a*-24*k*, analog pad 26, microphone 30, cameras 18*a*-18*c*, etc.,) may also be provided integrally with or separately from the game apparatus.

This invention can be applied to an information processing system in which respective processing for the information processing is distributedly executed by a plurality of computers, etc.

Although the present invention has been described and illustrated in detail, it is clearly understood that the same is by way of illustration and example only and is not to be taken by way of limitation, the spirit and the scope of the present invention being limited only by the terms of the appended claims.

What is claimed is:

1. An information processing apparatus having an inputter, a first display region, a second display region, and a storage storing an application program, the information processing apparatus configured to:
   select between a first mode executing a game application and a second mode executing a memo application;
   when the first mode is selected by the selector, execute the game application and display a result of the execution of the game application in the first display region and in the second display region;
   when the second mode is selected, capture at least one of a first game image of the result of execution of the game application displayed in the first display region and a second game image of the result of execution of the game application displayed in the second display region;
   when the second mode is selected, display in the first display region at least one of the first captured game image and the second captured game image; and
   when the second mode is selected, execute the memo application and display memo information in the second display region, wherein the memo information displayed in the second display region is created by an input to the inputter while the second mode is selected and the created memo information is displayed in the second display region while being created.

2. An information processing apparatus according to claim 1, wherein the first captured game image is an image of the result of execution of the game application displayed immediately before the second mode is selected in the first display region and the second captured game image is an image of the result of execution of the game application displayed immediately before the second mode is selected in the second display region.

3. An information processing apparatus according to claim 1, wherein when the second mode is selected, the information processing apparatus is configured to pause execution of the game application, and the first captured game image is an image of the result of execution of the game application displayed in the first display region when the game is paused and the second captured game image is an image of the result of execution of the game application in the second display region when the game is paused.

4. An information processing apparatus according to claim 1, wherein
   the information processing apparatus is configured to switch between the first mode and the second mode by a predetermined input to the inputter.

5. An information processing apparatus according to claim 4, further comprising a memory, wherein the information processing apparatus is configured to:
   develop the game application in the memory and executes the same,
   develop the memo application in the memory and executes the same, and
   determine whether or not both of the game application and the memo application are executed when there is a predetermined input to the inputter, and switch to the mode that is not currently selected out of the first mode and the second mode when it is determined that both of the game application and the memo application are executed when there is the predetermined input to the inputter.

6. An information processing apparatus according to claim 1, wherein
   when the second mode is selected, the information processing apparatus is configured to capture the first game image and the second game image, display in the first display region the first captured game image, and in response to a predetermined input, display in the first display region the second captured game image.

7. An information processing apparatus according to claim 1, wherein
   when the second mode is selected, the information processing apparatus is configured to capture the first game image and the second game image, and display the first captured game image and the second captured game image in the first display region while the memo information is displayed in the second display region.

8. An information processing apparatus according to claim 7, wherein
   the information processing apparatus is configured to display the first captured game image and the second captured game image in a reduced-size in the first display region.

9. An information processing apparatus according to claim 1, wherein
   the information processing apparatus is configured to switchably display, in the first display region, the first captured game image or the second captured game image.

10. An information processing apparatus according to claim 9, wherein the information processing apparatus is configured to:
    when the second mode is selected, capture the first game image and the second game image, and
    switchably display, in the first display region, a third application image being made up of the first captured game image and the second captured game image.

11. An information processing apparatus according to claim 10, wherein the third application image is an image obtained by arranging the first captured game image and the second captured game image and reduced to a size suitable for the first display region.

12. An information processing apparatus according to claim 1, wherein the information processing apparatus is configured to:
when the second mode is selected, capture the first game image and the second game image, and
switchably display between at least one of the first captured game image, the second captured game image, and a third application image including the first captured game image and the second captured game image.

13. An information processing apparatus according to claim 1, wherein
the storage is configured to store title information that is brought into correspondence with each application program stored in the storage, and
the information processing apparatus is configured to display in the first display region the title information corresponding to the game application executed by the first executor together with at least one of the first captured game image and the second captured game image.

14. An information processing apparatus according to claim 13, wherein
the information processing apparatus is configured to display the title information only for a predetermined time.

15. An information processing apparatus according to claim 1, further comprising:
a memo storage configured to store the first captured game image by bringing it into association with the memo information in the storage, and
the information processing apparatus is configured to display the stored first captured game image together with the memo information in at least one of the first display region and the second display region.

16. An information processing apparatus according to claim 15, wherein
the memo storage is further configured to store an icon image indicating the game application by bringing it into association with the memo information in the storage on the basis of an input to the inputter in the second mode, and
the information processing apparatus is further configured to display the icon image indicating the game application in at least one of the first display region and the second display region.

17. An information processing apparatus according to claim 1, further comprising a first display device and a second display device, wherein the information processing apparatus is configured to:
display the result of the execution of the game application in the first display device comprising the first display region and the second display device comprising the second display region,
when the second mode is selected, display at least one of the first captured game image and the second captured game image on the first display device, and
display the memo information on the second display device.

18. An information processing apparatus according to claim 17, wherein
the inputter includes a touch panel to be set on the second display device, and the information processing apparatus is configured to create the memo information on the basis of an input to the touch panel.

19. An information processing apparatus according to claim 1, wherein the information processing apparatus is configured to:
store the memo information in the storage,
execute the memo application, and display a list of the memo information stored in the storage in the second display region when the second mode is selected, and
when a predetermined memo information is selected from the list of the memo information displayed in the second display region by the list displayer, display the selected memo information in the second display region.

20. An information processing apparatus according to claim 1, wherein the information processing apparatus is configured to:
when the second mode is selected, capture the first game image and the second game image, and
display, in the second display region, controls for creating the memo information, the memo information is created using the controls while the first captured game image and the second captured game image are displayed in the first display region, and the created memo information is stored in storage together with the first captured game image and the second captured game image.

21. An information processing apparatus according to claim 1, wherein the memo information is created by the input to the inputter while the first captured game image and the second captured game image are displayed in the first display region.

22. An information processing apparatus according to claim 1, wherein when the second mode is selected, the information processing apparatus is configured to display, in the second display region, controls for editing the displayed memo information and a memo display region displaying the created memo information while being created by the input to the inputter.

23. An information processing apparatus according to claim 22, wherein the memo information is a handwritten memo created by the input to the inputter using a pen tool included in the controls.

24. An information processing apparatus according to claim 1, wherein:
when the second mode is selected, the information processing apparatus is configured to pause execution of the game application and display, in the first display region, the first captured game image and the second captured game image, the first captured game image and the second captured game image comprising the results of the execution of the game application that were displayed when the game application was paused.

25. A non-transitory storage medium storing an information processing program of an information processing apparatus having an inputter, a first display region, a second display region, and a storage storing an application program, the information processing program, when executed, causes a computer of the information processing apparatus to:
select between a first mode executing a game application and a second mode executing a memo application;
when the first mode is selected, execute the game application and display a result of the execution of the game application in the first display region and in the second display region;

when the second mode is selected, capture at least one of a first game image of the result of execution of the game application displayed in the first display region and a second game image of the result of execution of the game application displayed in the second display region, and display in the first display region at least one of the first captured game image and the second captured game image; and when the second mode is selected, execute the memo application and display memo information in the second display region, wherein the memo information displayed in the second display region is created by an input to the inputter while the second mode is selected and the created memo information is displayed in the second display region while being created.

26. An information processing system comprising an inputter, a first display region, a second display region, and a non-transitory computer readable medium storing an application program, and a computer system configured to at least:

select between a first mode executing a game application and a second mode executing a memo application;

when the first mode is selected, execute the game application and display a result of the execution of the game application in the first display region and in the second display region;

when the second mode is selected, capture at least one of a first game image of the result of execution of the game application displayed in the first display region and a second game image of the result of execution of the game application displayed in the second display region;

when the second mode is selected, display in the first display region at least one of the first captured game image and the second captured game image; and when the second mode is selected, execute the memo application and display memo information in the second display region, wherein the memo information displayed in the second display region is created by an input to the inputter while the second mode is selected and the created memo information is displayed in the second display region while being created.

27. The information processing system of claim 26, wherein the computer system is further configured to at least:

when the second mode is selected, display, in the second display region, memo information stored in storage and in response inputs to the inputter, modify the memo information displayed in the second display region.

28. The information processing system of claim 26, wherein the computer system is further configured to at least:

when the second mode is selected, displaying, in the second display region, controls for creating the displayed memo information and a memo display region displaying the memo information created by the input to the inputter, and wherein the memo information is created by the input to the inputter in the memo display region and while the first captured game image or the second captured game image is displayed with title information corresponding to the game application in the first display region.

29. An information processing method of an information processing apparatus having an inputter, a first display region, a second display region, and a storage storing an application program, including following steps of:

selecting between a first mode executing a game application and a second mode executing a memo application;

when the first mode is selected, executing the game application and displaying a result of the execution of the game application in the first display region and the second display region;

when the second mode is selected, capturing at least one of a first game image of the result of execution of the game application displayed in the first display region and a second game image of the result of execution of the game application displayed in the second display region;

when the second mode is selected, displaying in the first display region at least one of the first captured game image and the second captured game image; and when the second mode is selected, executing the memo application and displaying memo information in the second display region, wherein the memo information displayed in the second display region is created by an input to the inputter while the second mode is selected and the created memo information is displayed in the second display region while being created.

* * * * *